United States Patent
Yamada

(10) Patent No.: US 7,512,345 B2
(45) Date of Patent: Mar. 31, 2009

(54) WAVELENGTH DIVISION MULTIPLEXING OPTICAL TRANSMISSION SYSTEM AND METHOD

(75) Inventor: Keiichi Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 575 days.

(21) Appl. No.: 11/228,399

(22) Filed: Sep. 19, 2005

(65) Prior Publication Data

US 2006/0067700 A1    Mar. 30, 2006

(30) Foreign Application Priority Data

Sep. 28, 2004    (JP)    ............... 2004/281279

(51) Int. Cl.
*H04B 10/12* (2006.01)
*H04B 10/04* (2006.01)

(52) U.S. Cl. ....................... 398/147; 398/193
(58) Field of Classification Search ......... 398/147–150, 398/193
See application file for complete search history.

(56) References Cited

U.S. PATENT DOCUMENTS

| | | | |
|---|---|---|---|
| 5,877,879 A * | 3/1999 | Naito | ............... 398/91 |
| 5,991,471 A * | 11/1999 | Yu | ............... 385/3 |
| 6,324,317 B1 | 11/2001 | Tanaka | |
| 6,559,988 B1 * | 5/2003 | Nielsen et al. | ............... 398/82 |
| 6,607,311 B1 * | 8/2003 | Fishman et al. | ............... 398/79 |
| 2002/0101633 A1 | 8/2002 | Onaka et al. | |
| 2003/0095766 A1 | 5/2003 | Aikawa et al. | |
| 2004/0258353 A1* | 12/2004 | Gluckstad et al. | ............... 385/28 |
| 2005/0286829 A1* | 12/2005 | Mahgerefteh et al. | ............... 385/27 |
| 2006/0139740 A1* | 6/2006 | Korolev et al. | ............... 359/341.1 |

* cited by examiner

*Primary Examiner*—Nathan M Curs
(74) *Attorney, Agent, or Firm*—Dickstein, Shapiro, LLP.

(57) ABSTRACT

Disclosed is a wavelength division multiplexing (WDM) optical transmission system including: an optical transmitter for transmitting, to an optical fiber transmission path, a WDM signal obtained by multiplexing a plurality of optical signals on the optical fiber transmission path in terms of wavelength, the plurality of optical signals respectively having negative chirps; an optical receiver for receiving the WDM signal from the optical fiber transmission path; and at least one relay node which is provided between the optical transmitter and the optical receiver. Each of the relay node and the optical receiver includes a dispersion compensator for compensating a chromatic dispersion suffered in the optical fiber in the immediately preceding transmission span. Moreover, a dispersion adder for beforehand adding a predetermined positive dispersion amount to the WDM signal before transmission is included in the optical transmitter or at least one relay node.

30 Claims, 16 Drawing Sheets

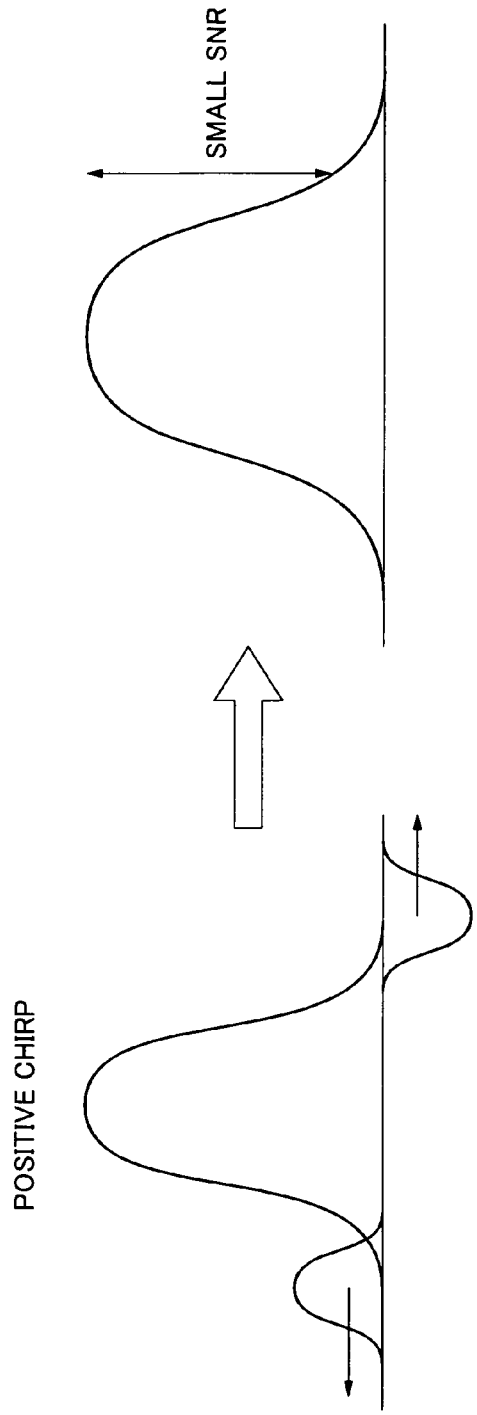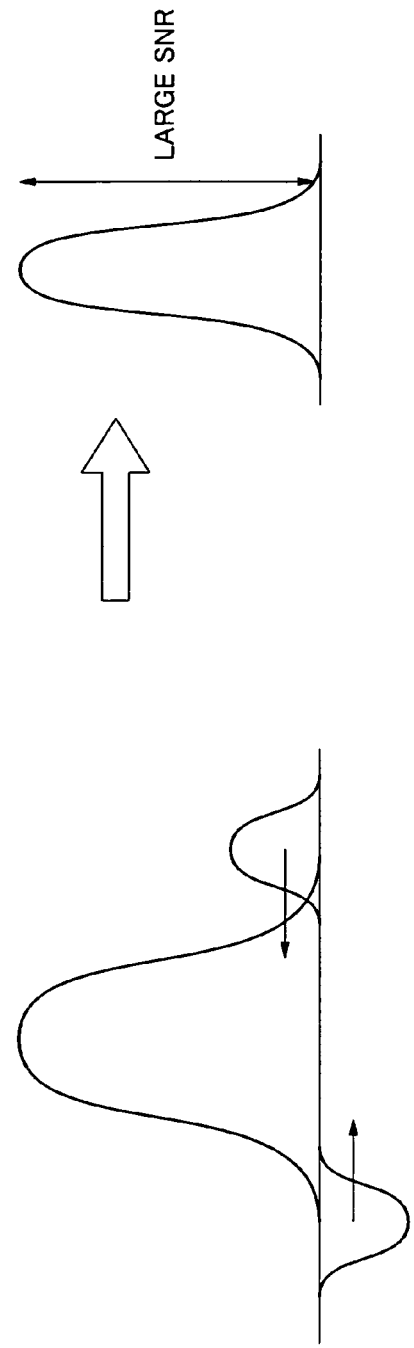
FIG.8A
FIG.8B

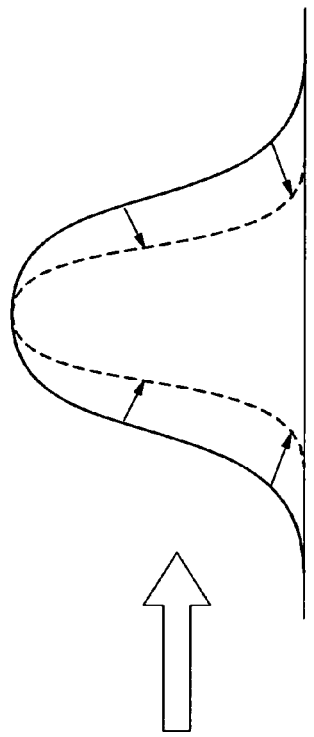
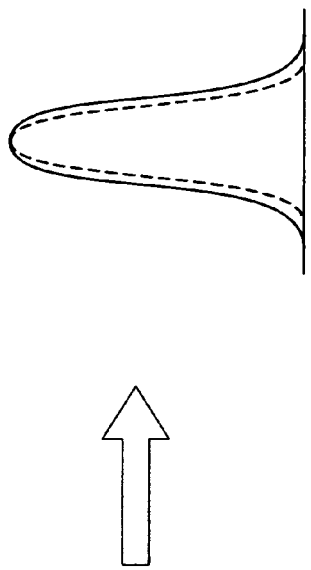
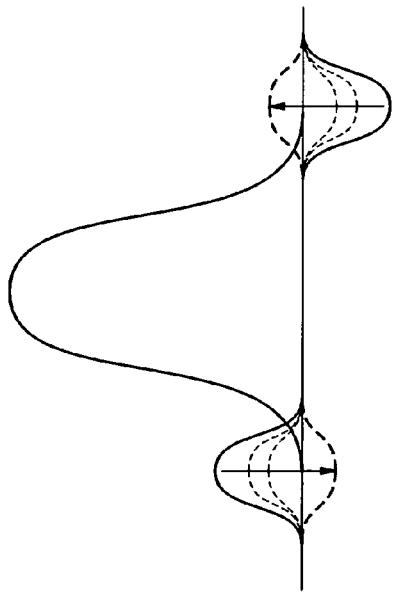
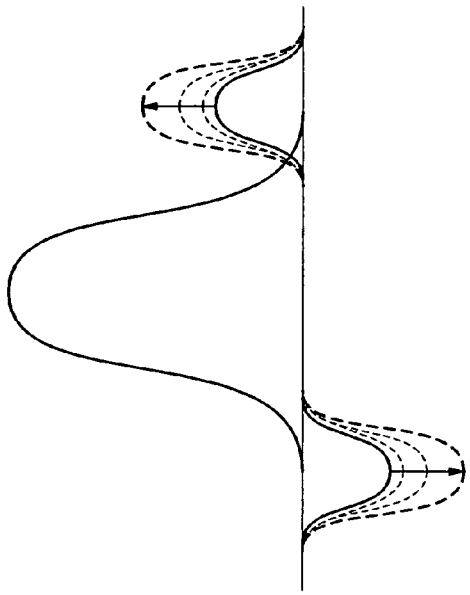
FIG.9A
FIG.9B

WAVELENGTH DIVISION MULTIPLEXING OPTICAL TRANSMISSION SYSTEM AND METHOD

BACKGROUND OF THE INVENTION

1. Field of the Invention

The present invention relates to a wavelength division multiplexing optical transmission system and a wavelength division multiplexing optical transmission method. More specifically, the present invention relates to a wavelength division multiplexing optical transmission system and a wavelength division multiplexing optical transmission method, both of which make it possible to make a residual dispersion value in a received optical signal an optimal value.

2. Description of the Related Art

An "optical transmission" method of transmitting, and receiving, information as a light intensity modulation signal has been used for the purpose of transmitting a large amount of data in a long distance in recent years. In the case of the optical transmission method, an optical transmitter converts an electrical signal to an optical signal (E/O conversion), and transmits the optical signal to an optical receiver. The optical receiver converts the received optical signal to an electrical signal (O/E conversion), and thereby obtains the original information. A communications system using an optical fiber as a transmission path has been generally known as a communications system employing the optical transmission method. In the case of the optical fiber communications system, a method of transmitting an optical signal which is obtained by multiplexing the signals on a single optical fiber has been used in order to increase the amount of information to be transmitted in each optical fiber.

A method of multiplexing signals while the signals are still in the form of electrical signals and a method of multiplexing signals after the signals are converted to optical signals are applicable to the optical transmission. As the former method, Time Division Multiplexing (TDM) and Frequency Division Multiplexing (FDM) are known. As the latter method, Space Division Multiplexing (SDM) and Wavelength Division Multiplexing (WDM) are known. Out of these methods, WDM is a method of causing a plurality of optical signals each with a different wavelength to be transmitted with a single optical fiber. Since WDM can use the existing optical fiber networks, WDM is economically advantageous, and is put into practical use widely throughout the world.

In the case of the WDM optical transmission system, signals are deteriorated stemming from chromatic dispersion in the transmission path (optical fiber). In other words, since a luminance element for the E/O conversion in an optical transmitter is a light source-whose spectrum spreads, each of optical signals to be sent out from the optical transmitter actually has some degree of a bandwidth. Optical signals with the respective different wavelengths (i.e., different frequencies) are different from one another in speed at which each of the optical signals travels through the optical fiber. For this reason, as the transmission distance becomes longer, phases are shifted depending on the frequency components even in a single optical signal. This constitutes a cause of bit errors.

For this reason, in the WDM optical transmission system, compensation is needed to return, to zero, chromatic dispersion suffered in the optical fiber transmission path for the purpose of inhibiting the signal from being deteriorated. United States Patent Application Publication No. US 2003/0095766A1 has disclosed an optical transmission system in which a dispersion compensation fiber is connected to a transmission path optical fiber in each span, and in which sufficient dispersion compensation is performed over the entire optical transmission path.

Descriptions will be provided for an example of a dispersion map of a conventional WDM optical transmission system with reference to FIG. 1A and FIG. 1B. As shown in FIG. 1A, in this WDM optical transmission system, optical signals from an optical transmitter are transmitted to an optical receiver through some relay nodes. The wavelengths are dispersed in the transmission path optical fiber in each of spans respectively between the optical transmitter and the nearest relay node, between each two neighboring relay nodes, and between the optical receiver and the nearest relay node.

For this reason, the dispersion is compensated by 100% in each of the spans by use of a Dispersion Compensation Fiber (DCF). The DCF has a dispersion value which is equal, in absolute value, to the dispersion of the span of the transmission path optical fiber, and whose sign is opposite to the dispersion of the span of the transmission path optical fiber. How the chromatic dispersion is compensated by use of the DCFs is shown in the dispersion map of FIG. 1B. The horizontal axis represents the transmission distance, and corresponds to each of the transmission spans shown in FIG. 1A. In the case of this compensation method, the WDM signal needs to be compensated collectively. For this reason, the dispersion slope of the transmission path optical fiber should be considered to compensate the chromatic dispersion by 100% in each of the transmission spans. With regard to transmission path fibers each with a higher dispersion slope, including some of Dispersion Shifted Fibers (DSFs), it is difficult for the dispersion to be compensated by 100% over the entire wavelengths of the WDM signal by use of the DCFs.

In addition, an LN (LiNbO3) optical modulator has been generally used as an optical modulator in an optical transmitter in the case where the long-distance transmission is performed. In general, the LN modulator is operated in a way that each of the optical signals has a negative chirp coefficient. The reason for this is that the dispersion is intended to be easily compensated for the purpose of inhibiting change in waveforms after performing the optical fiber transmission. The change in waveforms stems from combination of the Self Phase Modulation (SPM) and the chromatic dispersion. For this reason, with regard to the signals to be received by the optical receiver through the optical fiber, an optimum residual dispersion value does not take on zero, but a specific value. Incidentally, the optimum residual dispersion value is defined as the dispersion value which makes the bit error rate the smallest when test patterns (bit patterns) are sent out from the optical transmitter.

This point will be described in detail. Theoretically, when the residual dispersion value is returned to zero by means of completely compensating the dispersion, the signal takes the same waveform as the signal took when the signal was transmitted. However, when the dispersion is provided thereto, a phenomenon additionally occurs in which the bit error rate is further improved. This phenomenon occurs because of phase modulation accompanied by intensity modulation called "chirp". In a case where the chirp is present, the optical pulse is compressed due to dispersion accumulation. This improves the receiver sensitivity.

The chirp which causes the aforementioned phenomenon is a kind of phase modulation. The phase modulation includes the chirp which is provided due to characteristics of the optical transmitter at a time of transmission. In addition to the chirp, the phase modulation also includes nonlinear phase modulation which is provided due to an optical nonlinear effect in the transmission path optical fiber. The optical nonlinear effect is a phenomenon in which the refractive index of an optical fiber changes depending on the instantaneous optical power. Due to this phenomenon, the optical signal transmitted through the optical fiber suffers the phase modulation. The nonlinear phase modulation effects in the WDM system include Self Phase Modulation (SPM) stemming from its own channel and Cross Phase Modulation (XPM) stemming from other propagating channels in parallel. These nonlinear phase modulation effects occur at a moment when an optical signal is made incident onto the optical fiber transmission path from the optical amplifier. For this reason, the cumulative amount of the nonlinear phase modulation effects varies depending on the launched optical power into the optical fiber and the number of relays (i.e., repeat) of the optical amplifier, etc.

Even if the dispersion compensation fiber is designed to return the residual dispersion value to zero (achieve the 100% compensation), the amount of the chromatic dispersion varies from one wavelength to another, as shown in FIG. 2. In other words, the transmission path has a dispersion slope. For this reason, in a case where a dispersion compensation fiber which does not match the compensation dispersion value and the transmission path dispersion value with each other is used, it is difficult to cause all of the residual dispersion values of all the wavelength components to be equal to intended values.

By use of FIG. 3A and FIG. 3B, descriptions will be provided for causes of a compensation error which occurs in a case where a residual dispersion value in the optical receiver is not caused to return to zero in the conventional WDM optical transmission system. In the transmission system shown in FIG. 3A, it is supposed that the residual dispersion value at the optical receiver is the intended particular value other than zero as shown in a dispersion map in FIG. 3B. However, it is difficult to cause all of the residual dispersion values of all the wavelength components to be equal to the intended value, even if the optical receiver is designed not to compensate the chromatic dispersion in the last span by 100%. In other words, in a case where a dispersion compensation fiber which does not match the compensation dispersion value and the transmission path dispersion value with each other is used, the residual dispersion value of a particular wavelength component may be equal to the intended value, but the residual dispersion values of the other wavelength components are not equal to the intended values. As a consequence, the residual dispersion in the WDM bandwidth causes a compensation error in response to the dispersion slope in the transmission path fiber.

Particularly, in a case where the optical fiber as the transmission path is a DSF, this decreases the rate of compensation of the dispersion slope in the DCF. Accordingly, this brings about a problem of a large compensation error occurring in the residual dispersion. As described above, in the conventional WDM optical transmission system, it has been difficult to simultaneously achieve the causing of the targeted residual dispersion value (not "zero") of the received optical signal and the decreasing of the dispersion compensation error.

Incidentally, another related art have been disclosed in U.S. Pat. No. 6,324,317B1 or US Patent Application Publication No. US2002/0101633A1. In the case of these techniques, however, a negative preset dispersion is provided, and a final amount of the accumulated chromatic dispersion is in the negative region. The precondition for these techniques is different from the precondition for the present invention. Thus, no method of solving the aforementioned problems has been disclosed in these related arts.

SUMMARY OF THE INVENTION

The present invention was made in view of the foregoing and other problems, drawbacks and disadvantages of the conventional system and method.

An exemplary feature of the present invention is to provide a wavelength division multiplexing optical transmission system and a wavelength division multiplexing optical transmission method, both of which simultaneously achieve the causing of a targeted residual dispersion value of a received optical signal and the decreasing of the dispersion compensation error.

The present invention provides a wavelength division multiplexing optical transmission system including: an optical transmitter for transmitting, to an optical fiber transmission path, a WDM signal which is obtained by multiplexing a plurality of optical signals on the optical fiber transmission path in terms of wavelength, the plurality of optical signals respectively having negative chirps, and the plurality of optical signals differing from one another in wavelength; an optical receiver for receiving the WDM signal from the optical fiber transmission path; and at least one relay node provided between the optical transmitter and the optical receiver; wherein the optical transmitter includes a dispersion adder for beforehand adding a predetermined positive dispersion amount to the WDM signal before the WDM signal is transmitted; and wherein each of the relay nodes and the optical receiver includes a dispersion compensator for compensating a chromatic dispersion suffered in the optical fiber transmission path in the immediately preceding transmission span.

Further, the present invention provides a wavelength division multiplexing optical transmission system including: an optical transmitter for transmitting, to an optical fiber transmission path, a WDM signal which is obtained by multiplexing a plurality of optical signals on the optical fiber transmission path in terms of wavelength, the plurality of optical signals respectively having negative chirps, and the plurality of optical signals differing from one another in wavelength; an optical receiver for receiving the WDM signal from the optical fiber transmission path; and at least one relay node which is provided between the optical transmitter and the optical receiver; wherein each of the relay node and the optical receiver includes a dispersion compensator for compensating a chromatic dispersion suffered in the optical fiber in the immediately preceding transmission span; and wherein at least one of the relay nodes further includes a dispersion adder for adding a predetermined positive dispersion amount to the WDM signal before the WDM signal is transmitted to the optical fiber in the following transmission span.

Further, the present invention provides a wavelength division multiplexing optical transmission method in a wavelength division multiplexing optical transmission system including an optical transmitter, an optical receiver and at least one relay node which is provided between the optical transmitter and the optical receiver, the transmission method comprising the steps of: causing the optical transmitter to add a predetermined positive dispersion amount to a WDM signal which is obtained by multiplexing a plurality of optical signals on the optical fiber transmission path in terms of wavelength, and to thus transmit the WDM signal to an optical fiber transmission path, the plurality of optical signals modulated by an optical modulator so as to respectively have negative chirps, and the plurality of optical signals differing from one another in wavelength; causing each of the relay nodes to compensate a chromatic dispersion, which the received WDM signal has suffered in the optical fiber in the immediately preceding transmission span, and to thus transmit the WDM signal to the transmission path in the following transmission span; and causing the optical receiver to compensate a chromatic dispersion, which the received WDM signal has suffered in the optical fiber in the immediately preceding transmission span, and to thereby obtain the received WDM signal, which includes the predetermined positive dispersion amount.

Further, the present invention provides a wavelength division multiplexing optical transmission method in a wavelength division multiplexing optical transmission system including an optical transmitter, an optical receiver and at least one relay node which is provided between the optical transmitter and the optical receiver, the transmission method comprising the steps of: causing the optical transmitter to transmit, to an optical fiber transmission path, a WDM signal which is obtained by multiplexing a plurality of optical signals on the optical fiber transmission path in terms of wavelength, the plurality of optical signals respectively having negative chirps, and the plurality of optical signals differing from one another in wavelength; causing each of the relay nodes to compensate a chromatic dispersion, which the received WDM signal has suffered in the optical fiber in the immediately preceding transmission span, and to thus transmit the WDM signal to the transmission path in the following transmission span; causing at least one of the relay nodes to further add a predetermined positive dispersion amount to the WDM signal before the WDM signal is transmitted to the optical fiber in the following transmission span; and causing the optical receiver to compensate a chromatic dispersion, which the received WDM signal has suffered in the optical fiber in the immediately preceding transmission span, and to thereby obtain the received WDM signal, which includes the predetermined positive dispersion amount.

BRIEF DESCRIPTION OF THE DRAWINGS

The above and other exemplary aspects, features and advantages of the present invention will become more apparent from the following detailed description when taken in conjunction with the accompanying drawings wherein:

FIG. 8A and FIG. 8B are diagrams showing how a WDM signal varies depending on whether the chirp used in LN modulation takes on a positive value or on a negative value, FIG. 9A and FIG. 9B are diagrams showing how influence of nonlinear effects varies depending on whether the chirp used in LN modulation takes on a positive value or on a negative value.

DETAILED DESCRIPTION OF THE EXEMPLARY EMBODIMENTS

Exemplary embodiments of the present invention will now be described in detail in accordance with the accompanying drawings.

First of all, descriptions will be provided for a theory for the present invention. In the present invention, a positive preset dispersion value is beforehand given to the WDM signal in any one of the optical transmitter and the relay nodes, and thereafter the WDM signal thus provided with the positive dispersion value is transmitted to the optical receiver through the optical fiber transmission path. Thereby, only if the chromatic dispersion is compensated by 100% in each span in the transmission path, the signal received by the optical receiver can be the signal in which an optimum dispersion value (approximately tens ps/nm to approximately thousands ps/nm; and most advantageously, approximately not smaller than +100 ps/nm but smaller than +500 ps/nm in particular) remains. Hereinafter, descriptions will be provided for the exemplary embodiments of the present invention based on the aforementioned theory.

First Exemplary Embodiment

Figure 1A:
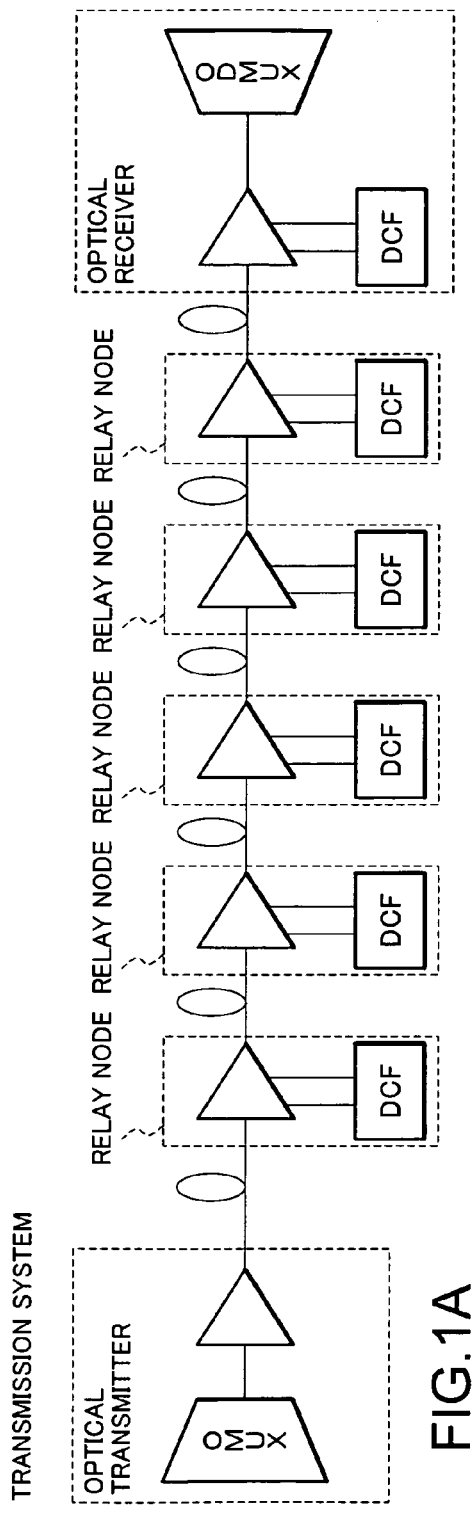
FIG. 1A and FIG. 1B are diagrams showing a dispersion map of chromatic dispersion in a conventional WDM optical transmission system.
Figure 1B:
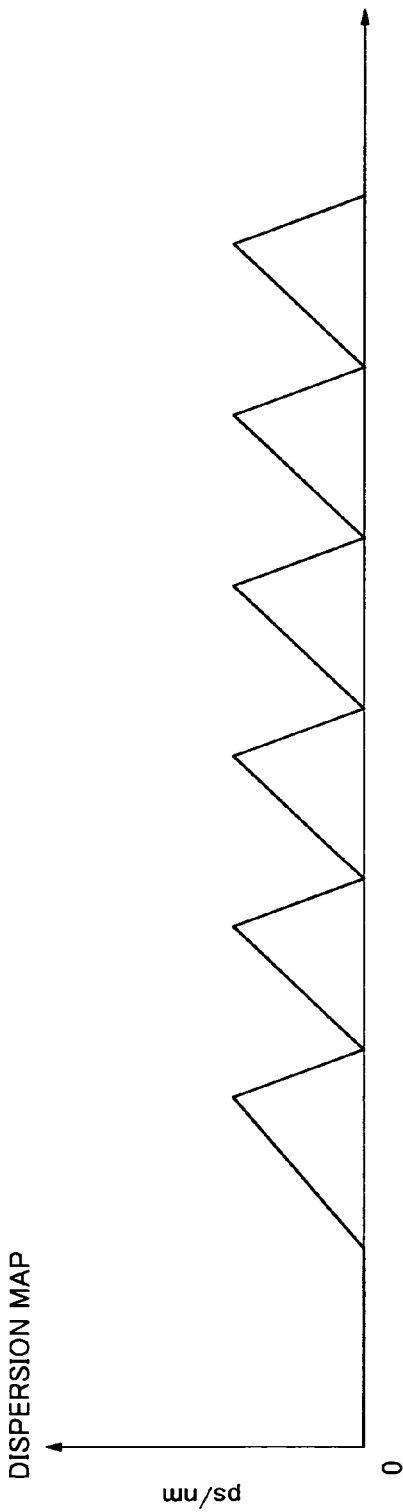
Figure 2:
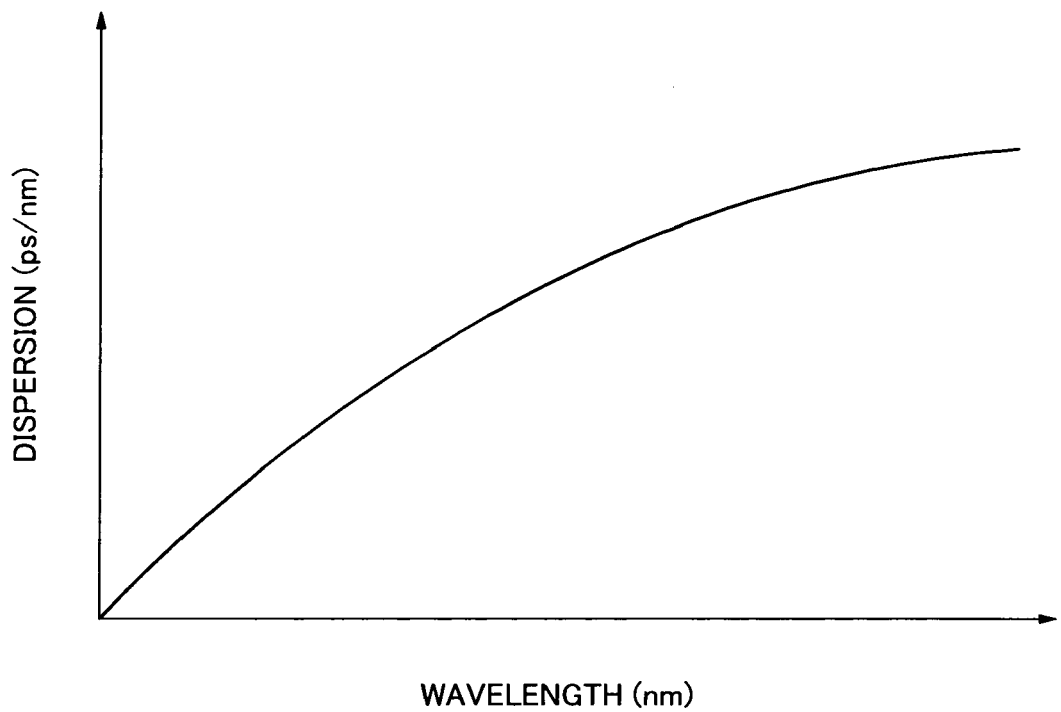
FIG. 2 is a graph showing a dispersion slope of an optical fiber.
Figure 3A:
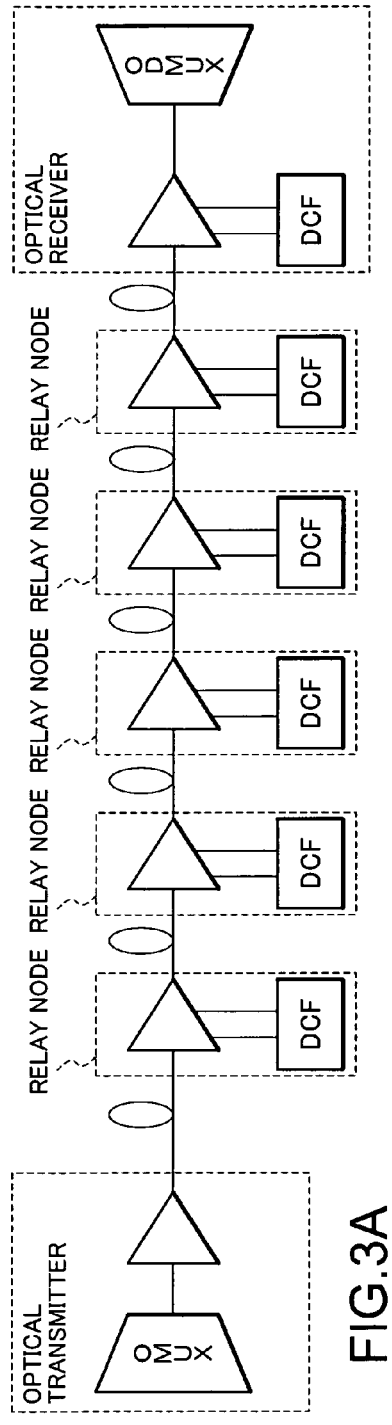
FIG. 3A and FIG. 3B are diagrams showing a dispersion map in a case where a residual dispersion value in an optical receiver is not returned to zero in the conventional WDM optical transmission system.
Figure 3B:
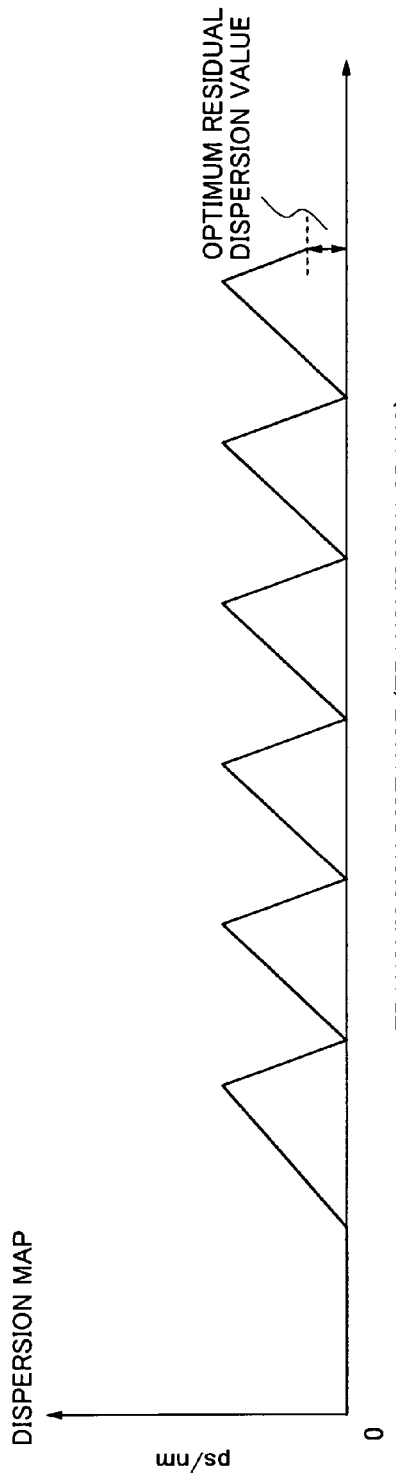
Figure 4A:
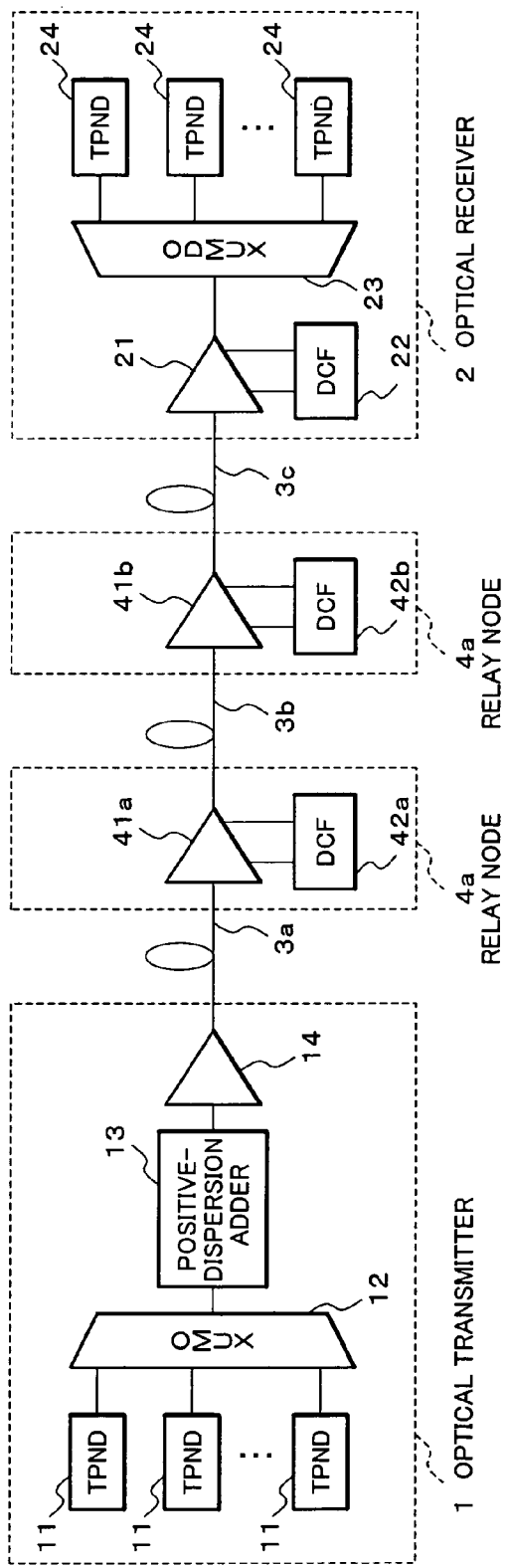
FIG. 4A and FIG. 4B are diagrams showing a configuration of a WDM optical transmission system according to a first exemplary embodiment of the present invention.

By use of FIG. 4A, descriptions will be provided for a configuration of a WDM optical transmission system according to the first exemplary embodiment of the present invention. This WDM optical transmission system has a configuration in which an optical transmitter 1 and an optical receiver 2 are connected with each other through a transmission path optical fiber 3 (spans 3a, 3b, 3c, . . . ) and relay nodes 4 (4a, 4b, . . . ).

The optical transmitter 1 includes a plurality of transponders 11, an Optical Multiplexer (OMUX) 12, a positive-dispersion adder 13 and an optical amplifier 14. The plurality of transponders (TPND) 11 correspond respectively to wavelengths to be multiplexed, as a WDM signal (for example, in the wavelength range of 1.5 µm), on the transmission path optical fiber.

Figure 4B:
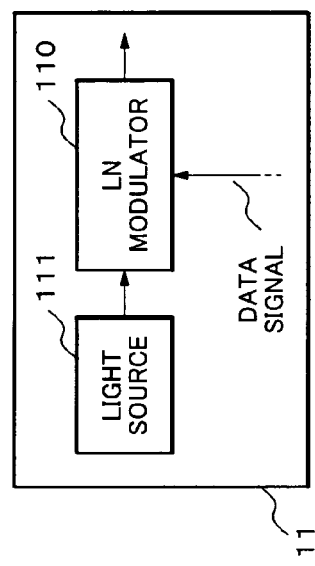

The transponders 11 receive a signal (data) to be transmitted from a client terminal (not illustrated), and modulates the light intensity by use of an LN (LiNbO3) modulator on the basis of the signal thus received. Then, the transponders 11 output to the OMUX 12 the signal, light intensity of which is thus modulated. In a case where the data from the client is in the form of an optical signal, the optical signals are once converted to an electric signal through O/E conversion. As shown in FIG. 4B, each of the transponders 11 includes inside at least a publicly-known LN modulator 110 and a light source 111 of wavelengths to be transmitted. Data signals to be transmitted are inputted into the LN modulator 110. Each of the transponders 110 further includes a configuration needed to control operations of its own, although the configuration is not illustrated in detail.

The OMUX 12 multiplexes the optical signals inputted respectively from the transponders 11. The OMUX 12 can be realized, for example, by use of Arrayed Waveguide Grating (AWG). The positive-dispersion adder 13 adds a positive dispersion to the optical signals. In the present invention, the LN modulator is controlled by use of a negative chirp, as described below. It was found that the aforementioned optimum residual dispersion value "X" for the present invention was +100 ps/nm to +500 ps/nm. In this embodiment, therefore, the positive-dispersion adder 13 adds a dispersion value X of +100 ps/nm to +500 ps/nm, as the target optimum residual dispersion value, to the optical signals. A photonic crystal fiber, a single mode fiber and the like can be applied for the positive-dispersion adder 13. With regard to the single mode fiber, more specifically, 1.3 µm zero-dispersion single mode fiber can be applied for the positive-dispersion adder 13. The optical amplifier 14 amplifies the WDM optical signal.

The optical receiver 2, includes an optical amplifier 21, a dispersion compensator 22, an Optical De-Multiplexer (ODMUX) 23 and a plurality of transponders (TPND) 24. The plurality of transponders 24 correspond respectively to wavelengths of the WDM signal. The optical amplifier 21 amplifies the optical signals to be transmitted thereinto through the immediately preceding span 3c of the optical fiber. The dispersion compensator 22 can be realized, for example, by use of a Dispersion Compensation Fiber (DCF). The DCF 22 compensates a chromatic dispersion suffered in the optical fiber 3c between the optical receiver 2 and its immediately preceding relay node 4b. The ODMUX 23 separates the received WDM optical signals to the respective channels (wavelengths), and outputs the WDM optical signals thus separated respectively to the transponders 24 corresponding to the wavelengths. The ODMUX 23 can be realized by use of Arrayed Waveguide Grating (AWG), for example. The transponders 24 detect the optical signals received from the ODMUX 23. For example, in the transponder 24, an optical receiving device detects whether or not an optical signal with the specific wavelength has been received through a bandpass filter corresponding the wavelength. The transponder 24 outputs the received signals to the client terminal (not illustrated). In the case where the signals are intended to be outputted, in the form of optical signals, to the client terminal, the signals are once converted to the electrical signals, and thereafter are once again converted to the optical signals each with a desired wavelength.

A dispersion shifted fiber, a 1.3 µm zero-dispersion single mode fiber, a non-zero dispersion shifted fiber and the like can be applied for the optical fibers 3a, 3b and 3c respectively in the spans constituting the transmission path optical fiber 3.

The relay node 4a includes an optical amplifier 41a and a dispersion compensator to be realized by use of a Dispersion Compensation Fiber (DCF) 42a. The optical amplifier 41a amplifies the optical signals to be transmitted thereinto through the optical fiber 3a. The DCF 42a compensates the chromatic dispersion suffered in the optical fiber 3a between the relay node 4a and the optical transmitter 1. Another relay node 4b includes an optical amplifier 41b and a DCF 42b, in common with the relay node 4a. Only the two relay nodes have been illustrated in FIG. 4A. However, the number of transmission spans and relay nodes to be used in a real situation is determined depending on the total transmission distance.

Figure 5A:
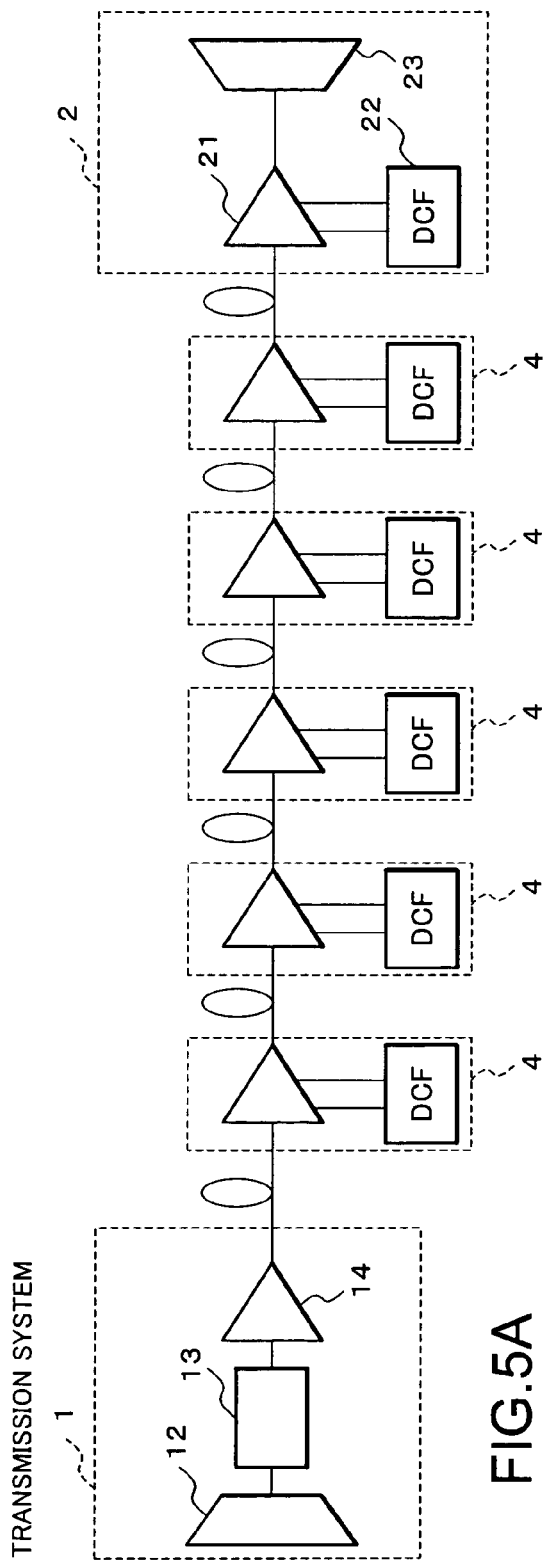
FIG. 5A and FIG. 5B are diagrams showing a dispersion map of a residual dispersion value in the WDM optical transmission system according to the first exemplary embodiment of the present invention.
Figure 5B:
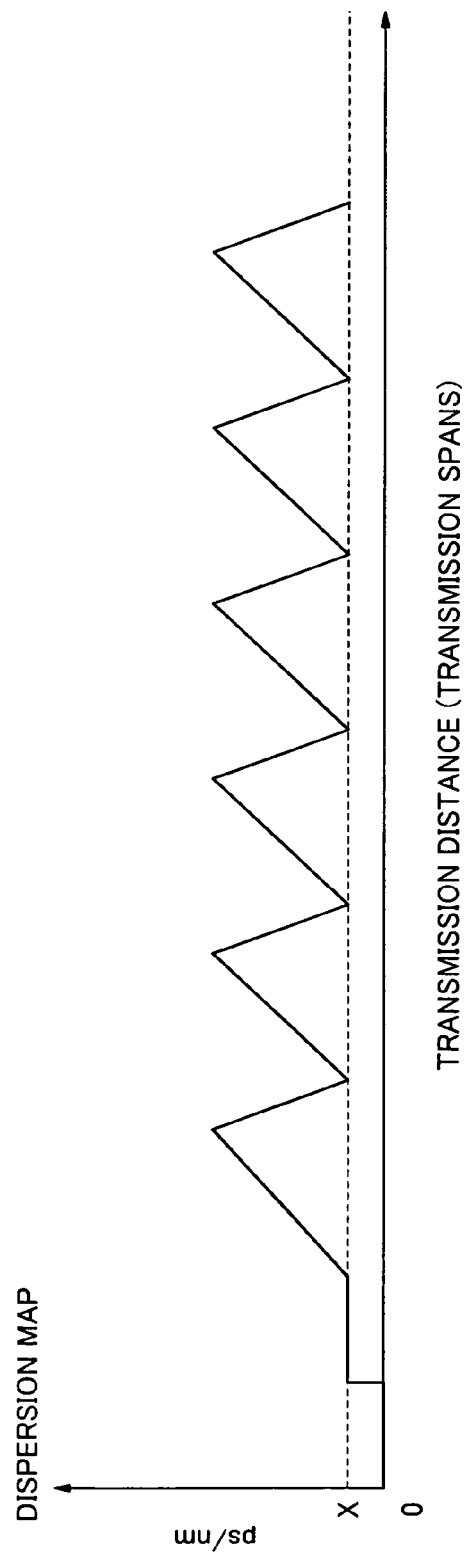

In this embodiment, the relay nodes 4a and 4b in the transmission path respectively compensate, by 100%, the chromatic dispersions in the spans (the optical fibers 3a and 3b). A dispersion map of the residual dispersion value is shown in FIG. 5A and FIG. 5B. By use of FIG. 4A, FIG. 5A and FIG. 5B, descriptions will be provided for operations of the WDM optical transmission system according to this embodiment. The WDM signal added the optimum dispersion value (preset dispersion value X) by the positive-dispersion adder 13 is outputted from the optical transmitter 1 to the transmission path directed towards the optical receiver 2. The chromatic dispersion (dispersion suffered by the transmission path) begins to occur in the transmission path. Then, the dispersion value of the WDM signal increases gradually. When the WDM signal reaches each of the relay nodes 41a and 41b, the chromatic dispersion introduced by the transmission path is compensated by 100% respectively by the DCFs 42a and 42b (i.e., the dispersion value in the WDM signal returns to the preset dispersion value X). In other words, the chromatic dispersion of the WDM signal is caused to decrease by the chromatic dispersion suffered by the transmission path which has occurred in the immediately preceding optical fiber 3a and 3b. Thereby, the WDM signal outputted from one relay node to the next relay node includes the dispersion equal to the preset dispersion X value added in the optical transmitter 1. Similarly, the WDM signal outputted from a relay node immediately preceding the optical receiver 2 includes the dispersion equal to the preset dispersion value. The dispersion occurred in the transmission path fiber between the optical receiver 2 and the immediately preceding relay node is also compensated by 100% by use of the DCF 22 in the optical receiver 2. Thereby, finally, only the preset dispersion value added in the positive-dispersion adder 13 in the optical transmitter 1 remains in the received WDM-signal.

The optical signals transmitted from the transponders 11 in the optical transmitter 1 are defined as negative chirps which makes it easy to perform dispersion management on waveform deterioration stemming from chromatic dispersion and nonlinear effects during multi-span transmission. Additional descriptions will be provided for the chirp in the LN modulator in the optical transmitter.

Figure 6:
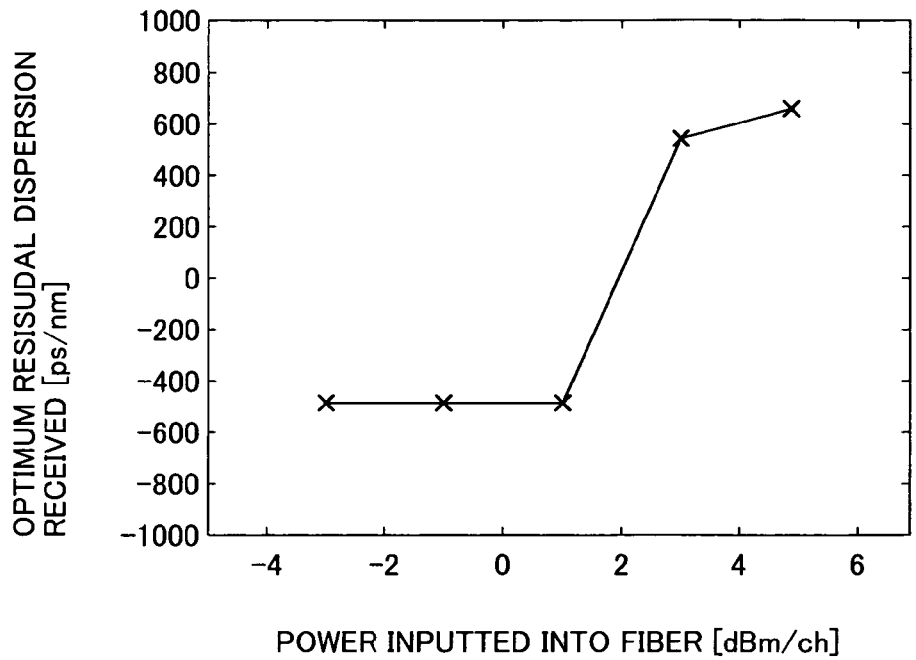
FIG. 6 is a graph showing a residual dispersion value in each node in a case where an LN modulator is designed to take on a positive chirp.

FIG. 6 shows a relationship between the input optical power into the optical fiber and an optimum residual dispersion value to be received, which relationship is observed in a case where transmission is performed at a bit rate of 10 Gbit/s over a transmission distance of DSF 80 km×6 spans while the LN modulator is caused to operate with positive chirp. As shown in FIG. 6, in the case where the LN modulator is caused to operate with positive chirp, the dispersion compensation in each of the relay nodes can not be achieved accurately due to a combination of self phase modulation and chromatic dispersion suffered in the transmission path. Furthermore, a fluctuation of the inputted power into the optical fiber transmission path is also caused by the combination. If the inputted power into the optical fiber transmission path is fluctuated, this leads to fluctuation of the optimum residual dispersion value at the optical receiver 2.

Figure 7:
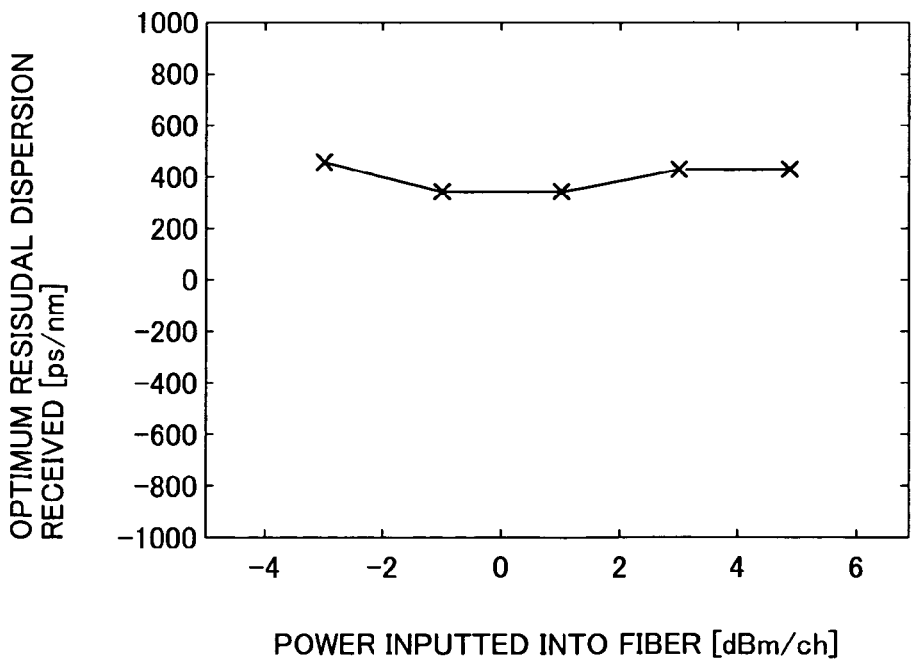
FIG. 7 is a graph showing a residual dispersion value in each node in a case where an LN modulator is designed to take on a negative value.

FIG. 7 shows a relationship between the input optical power into the optical fiber and an optimum residual dispersion value to be received, which relationship is observed in a case where transmission is performed at a bit rate of 10 Gbit/s over a transmission distance of DSF 80 km×6 spans while the LN modulator is caused to operate with negative chirp. As shown in FIG. 7, in the case where the chirps of the optical signals are caused to be "negative", the optimum residual dispersion value is kept virtually constant regardless of the dispersion map or the incident power onto the optical fiber.

By use of FIG. 8A and FIG. 8B, more detailed descriptions will be provided for influence of the difference in chirp between "positive" and "negative". In the case of the positive chirp, the shorter wavelength travels slower, and the longer wavelength travels faster. For this reason, the WDM signal is dispersed widely as shown in FIG. 8A. On the contrary, in the case of the negative chirp, the shorter wavelength travels faster, and the longer wavelength travels slower. For this reason, the WDM signal is compressed around the center wavelength component as shown in FIG. 8B. As a result, the signal-to-noise ratio (SNR) is high in the case of the negative chirp.

FIG. 9A and FIG. 9B show influence of the nonlinear effects which is observed in conjunction with change in the input power into the optical fiber. As the input power into the optical fiber increases, the nonlinear effects have a stronger influence. The nonlinear effects cause the shorter wavelengths to travel faster, and cause the longer wavelengths to travel shorter, like as in the case of the negative chirps. For this reason, in the case of the positive chirp, increase of the input power into the optical fiber makes it likely that the chirp is actually inverted between positive and negative (as shown in FIG. 9A).

This causes the signal waveform to largely change in conjunction with the change in the input power into the optical fiber in the case of the positive chirp. Accordingly, the optimum residual dispersion value changes from negative to positive to a large extent, as shown in FIG. 6. On the contrary, in the case of the negative chirp, no substantial chirp inversion is observed even if the input power into the optical fiber changes. For this reason, change in the signal waveform is small (as shown in FIG. 9B). As a consequence, the optimum residual dispersion value is a substantially constant value, as shown in FIG. 7. From this, it is found that, advantageously, the optical signals are transmitted by means of exercising control so as to cause the optical signals to have the respective negative chirps. In the case of each of the exemplary embodiments of the present invention, the optical signals outputted from the LN modulator which is the optical modulator have the respective negative chirps.

Thereby, the residual dispersion value of the signals received in the optical receiver can be an optimum value, only if the chromatic dispersion generated by the transmission path is compensated by 100% in each span.

In this embodiment, the residual dispersion value of the signal received in the optical receiver can be an optimum value in this manner, even if the dispersion map designed to compensate the chromatic dispersion by 100% in each span is used.

Particularly in a case where a DSF is used as the transmission path optical fiber, the dispersion slope compensation ratio of the DSF is low. This has heretofore brought about a problem of causing a large compensation error in the residual dispersion. In the present invention, however, even if the DSF is used for the transmission path, the causing of the residual dispersion value of the received optical signal to be the optimum value other than zero and the decreasing of the dispersion compensation error can be achieved simultaneously.

Second Exemplary Embodiment

Figure 10:
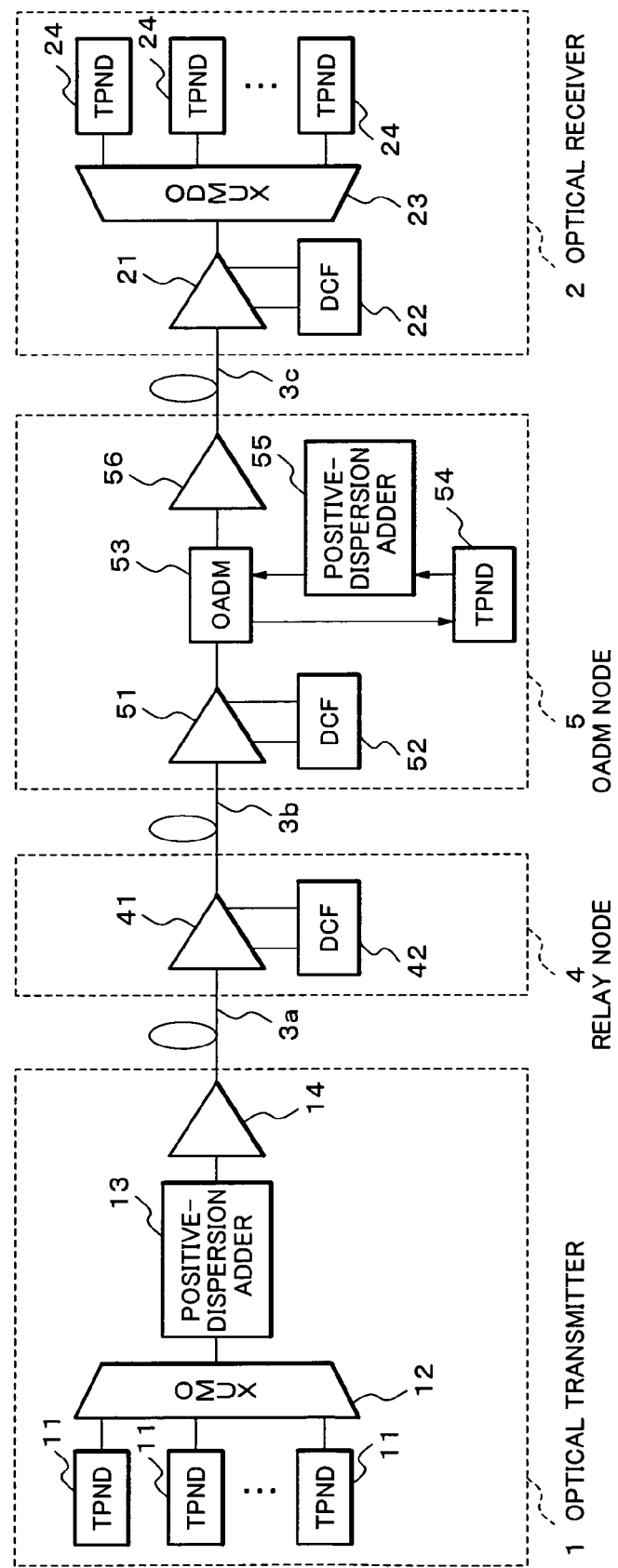
FIG. 10 is a diagram showing a configuration of a WDM optical transmission system according to a second exemplary embodiment of the present invention.

Next, by use of FIG. 10, descriptions will be provided for a configuration of a WDM optical transmission system according to a second exemplary embodiment of the present invention. This WDM optical transmission system has a configuration in which an optical transmitter 1 and an optical receiver 2 are connected with each other through an optical fiber 3 (spans 3*a*, 3*b*, 3*c*, . . . ), a relay node 4 and an Optical Add Drop Multiplexer (OADM) node 5. The optical transmitter 1, the optical receiver 2, the optical fiber 3 and the relay node 4 respectively have the same configurations as those according to the first embodiment have.

The OADM node 5 includes an optical amplifier 51, a dispersion compensator using a Dispersion Compensation Fiber (DCF) 52, an OADM 53, a transponder 54, a positive-dispersion adder 55 and an optical amplifier 56.

The optical amplifier 51 amplifies an optical signal from the relay node 4 through the optical fiber 3*b*. The DCF 52 compensates the chromatic dispersion suffered in the optical fiber 3*b*. The OADM 53 has a DROP function and an ADD function. The DROP function is to drop only an arbitrary wavelength channel from the received WDM optical signal, and to output the dropped wavelength channel to the transponder 54. The ADD function is to add an optical signal from the transponder 54 to the WDM optical signal.

The ADD function carried out by the transponder 54 is to receive signals (data) from a client terminal (not illustrated), and modulates the light intensity by use of an LN modulator on the basis of the received signals. Then, the transponder 54 outputs the modulated optical signals to the positive-dispersion adder 55. In a case where the data from the client is in the form of an optical signal, the optical signals are once converted to electric signals through O/E conversion. The LN modulator performs the same operations as the LN modulator described in FIG. 4B. Each of the modulated optical signals has a negative chirp. The DROP function performed by the transponder 54 is to receive, and to detect, the optical signal which the OADM 53 has dropped from the WDM signal. For example, an optical receiving device detects whether or not an optical signal with the arbitrary wavelength has been received through a bandpass filter corresponding to the wavelength. The transponder 54 outputs the received signals to the client terminal (not illustrated). In the case where the signals are intended to be outputted, in the form of optical signals, to the client terminal, the signals are once converted to the electrical signals, and thereafter are once again converted to the optical signals each with a desired wavelength.

The positive-dispersion adder 55 adds a positive preset dispersion to the optical signal which has been received from the transponder 54, and outputs to the OADM 53 the optical signal with the positive dispersion added thereto. In this embodiment, the dispersion value is in range of +100 ps/nm to +500 ps/nm, as described above. The positive-dispersion adder 55 is designed to add a dispersion value equal to the added dispersion value X by the positive-dispersion adder 13 in the optical transmitter 1. The optical amplifier 51 amplifies the WDM optical signal outputted by the OADM 53.

Figure 11:
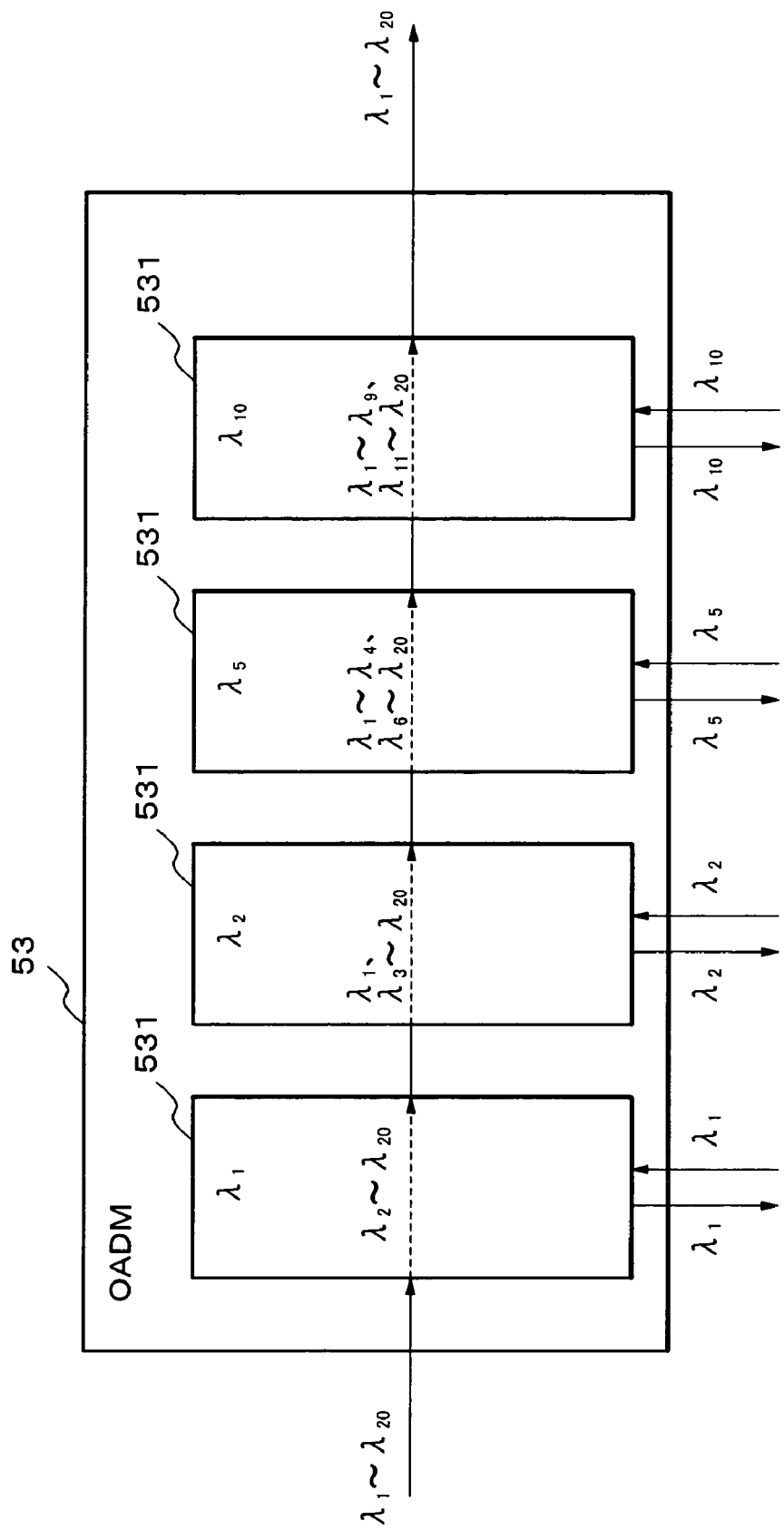
FIG. 11 is a diagram showing a configuration of an OADM according to the second exemplary embodiment of the present invention.

FIG. 11 shows an example of a configuration of the OADM 53. At least one λ module 531, which is detachable, is attached to the OADM 53. The λ module 531 is designed to correspond to any one wavelength of the wavelength components in the WDM signal. The λ module 531 drops, from the WDM signal, optical signal with a wavelength to which the λ module 531 corresponds, and superimposes on the WDM signal an ADD signal to which the λ module 531 corresponds. For example, in a case where the WDM signal is constituted of wavelength components λ1 to λ20, the λ module 531 corresponding to the wavelength λ1 drops the wavelength component λ1 from the WDM signal, and lets the wavelength components λ2 to λ20 pass through it. In addition, the λ module 531 corresponding to the wavelength λ1 superimposes an optical signal (ADD signal) constituted of the wavelength λ1 onto the WDM signal (through signal) constituted of the wavelength components (λ2 to λ20) which the λ module 531 let pass through it. Incidentally, the configuration in which the OADM 53 includes the λ modules 531 has been given as the example of the configuration of the OADM 53 here. However, no matter what configuration may be used for the OAMD 53, if the configuration enables a desired wavelength component to be added to, and dropped from, the WDM signal. The OADM 53 may take a publicly-known configuration in which an optical switch or a wavelength blocker is used, for example.

Figure 12:
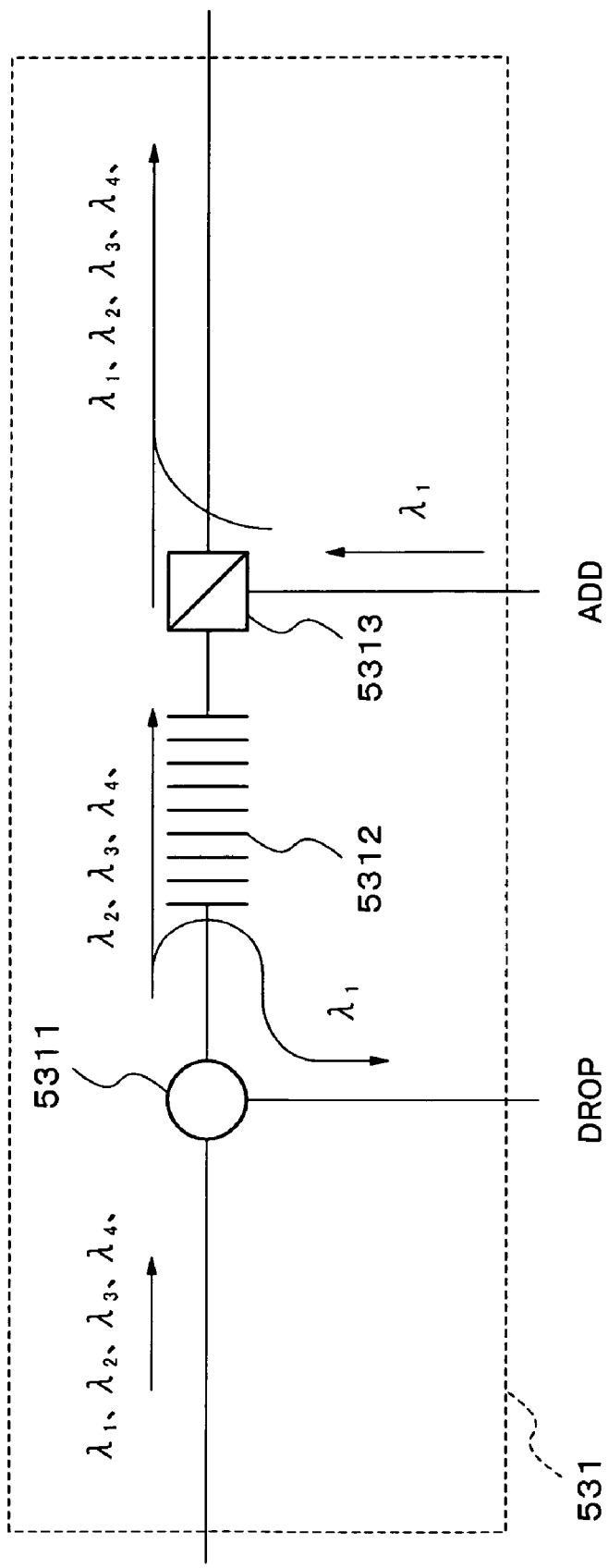
FIG. 12 is a diagram showing a configuration of a λ module shown in FIG. 11, FIG. 13A and FIG. 13B are diagrams showing the reason why a difference in dispersion value occurs between the through signal and an ADD signal in the OADM in a case where the residual dispersion value at the optical receiver is not zero in the WDM optical transmission system.

FIG. 12 shows an example of a configuration of the λ module. The λ module 531 includes a circulator 5311, a fiber grating 5312 and an optical coupler 5313. The circulator 5311 guides to the fiber grating 5312 the WDM signal inputted from the outside, and drops an optical signal reflected by the fiber grating 5312.

The fiber grating 5312 reflects only a wavelength component, which the λ module 531 corresponds to, out of the wavelength components of the WMD signal from the circulator 5311, and sends back to the circulator 5311 the reflected wavelength component. The fiber grating 5312 lets the other wavelength components pass through it, and sends out the passing wavelength components to the optical coupler 5313. The optical coupler 5313 superimposes the wavelength components of the WDM signal, which the fiber grating 5312 let pass through it, and the ADD signal on one another.

For example, it is supposed that the λ module 531 of FIG. 12 corresponds to a wavelength component λ1 and the WDM signal inputted from the outside is constituted of wavelength components λ1 to λ4. The inputted WDM signal is guided to the fiber grating 5312 by the circulator 5311. The fiber grating 5312 reflects only an optical signal with the wavelength λ1, and sends the reflected optical signal back to the circulator 5311. The fiber grating 5312 lets optical signals with the respective wavelengths λ2 to λ4 pass through it. On the other hand, in the optical coupler 5313, the ADD signal with the wavelength λ1 is superimposed on the wavelength components λ2 to λ4 passed through the fiber grating 5312. Thereby, the WDM signal constituted of the wavelength components λ1 to λ4 is outputted from the λ module 531.

Figure 13A:
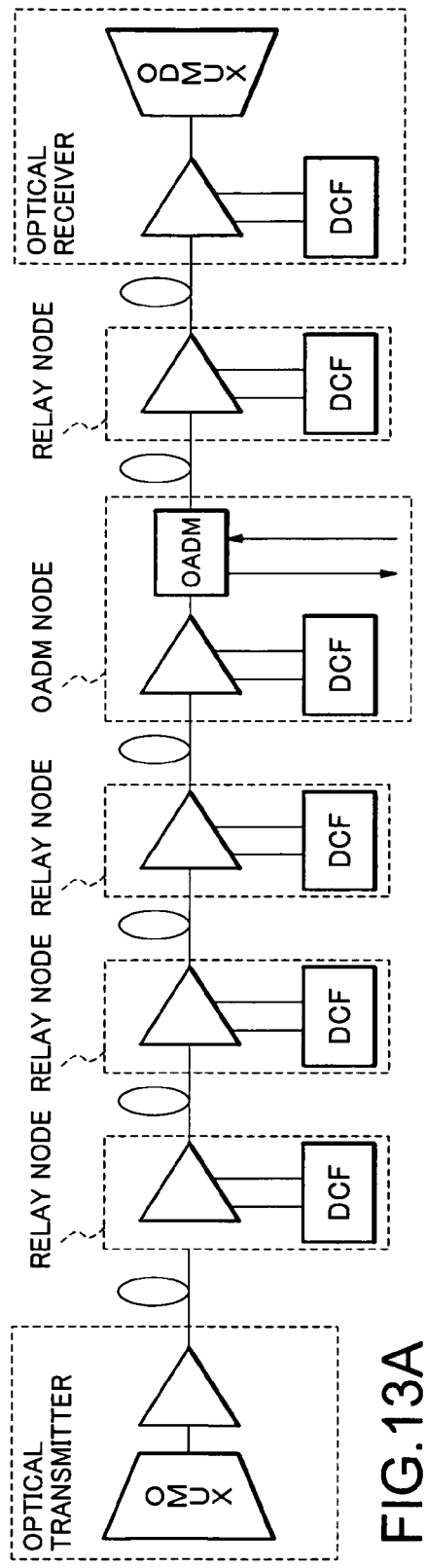
Figure 13B:
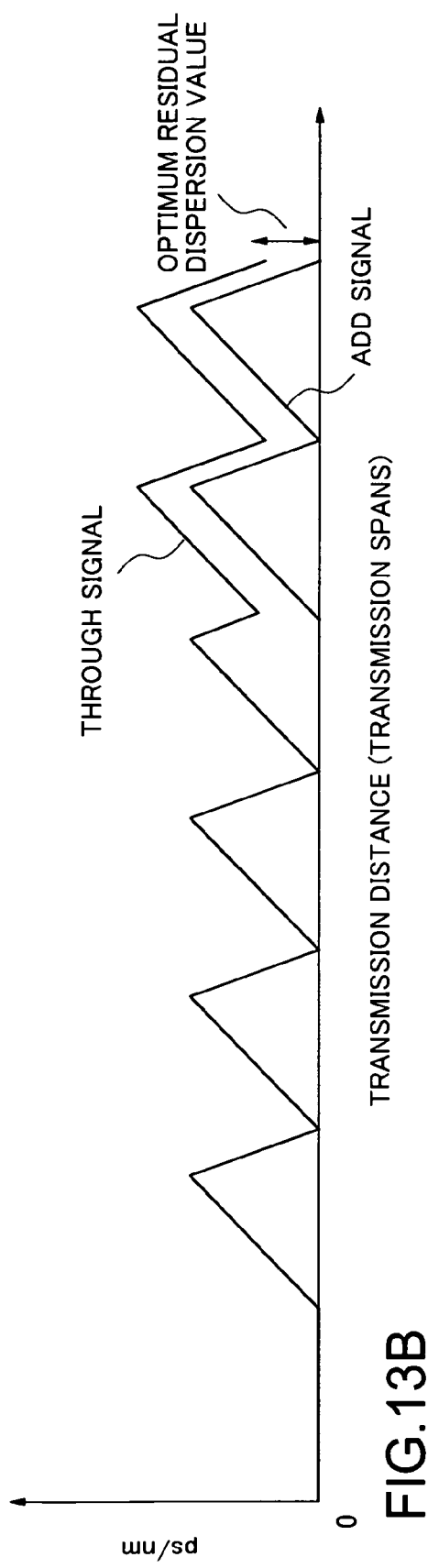

A WDM optical transmission system including an OADM node brings about a problem in addition to the above-described problems with the related art, in a case where the residual dispersion value of the optical signal dropped in the OADM node is caused to be the optimum value other than zero. By use of FIG. 13A and FIG. 13B, descriptions will be provided for the additional problem giving an example of no preset dispersion being added. Specifically, as shown in FIG. 13B, there is difference in residual dispersion amount between the components to pass through the OADM node in the WDM signal and the optical signal to be added in the OADM node.

In this embodiment, the LN modulator in each of the transponders 11 in the optical transmitter 1 operates with negative chirp which brings about relatively small nonlinear effects during multi-span transmission. Furthermore, a specific preset positive dispersion value is given to the WDM optical signal outputted from the optical transmitter 1 and the ADD signal in the OADM node 5.

Figure 14A:
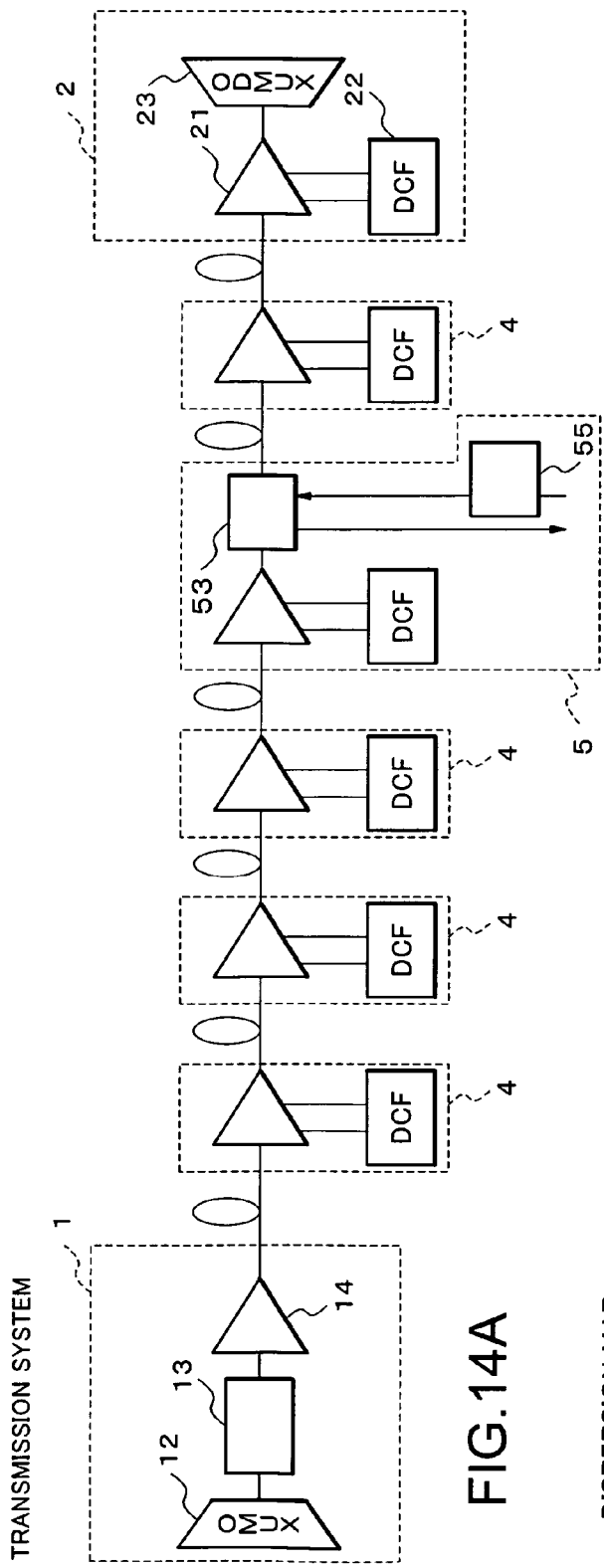
FIG. 14A and FIG. 14B are diagrams showing a dispersion map of a residual dispersion value in the second exemplary embodiment of the present invention.
Figure 14B:
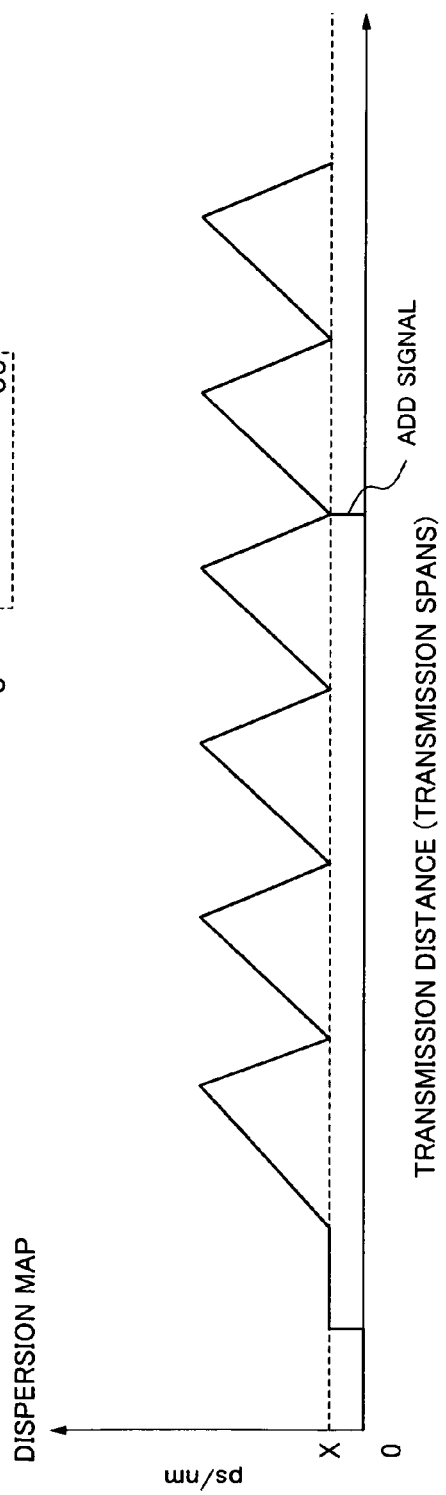

Thereby, if chromatic dispersion generated by the transmission path is compensated by 100% in each span, this makes the residual dispersion value of the signal to be received by the optical receiver 2 an optimum value, as shown in FIG. 14A and FIG. 14B. Moreover, this makes the dispersion value in the wavelength components to pass through the OADM node 5 in the WDM optical signal agree with the dispersion value of the ADD signal in the OADM node 5.

According to this embodiment, even if the dispersion map designed to compensate the chromatic dispersion by 100% in each span is used, the residual dispersion value of the received signal at the optical receiver 2 can be made an optimum value in the aforementioned manner. As well, even if the OADM node is inserted into the transmission path, the optical receiver 2 can receive the WDM signal which includes the optimum residual dispersion value.

Third Exemplary Embodiment

Figure 15:
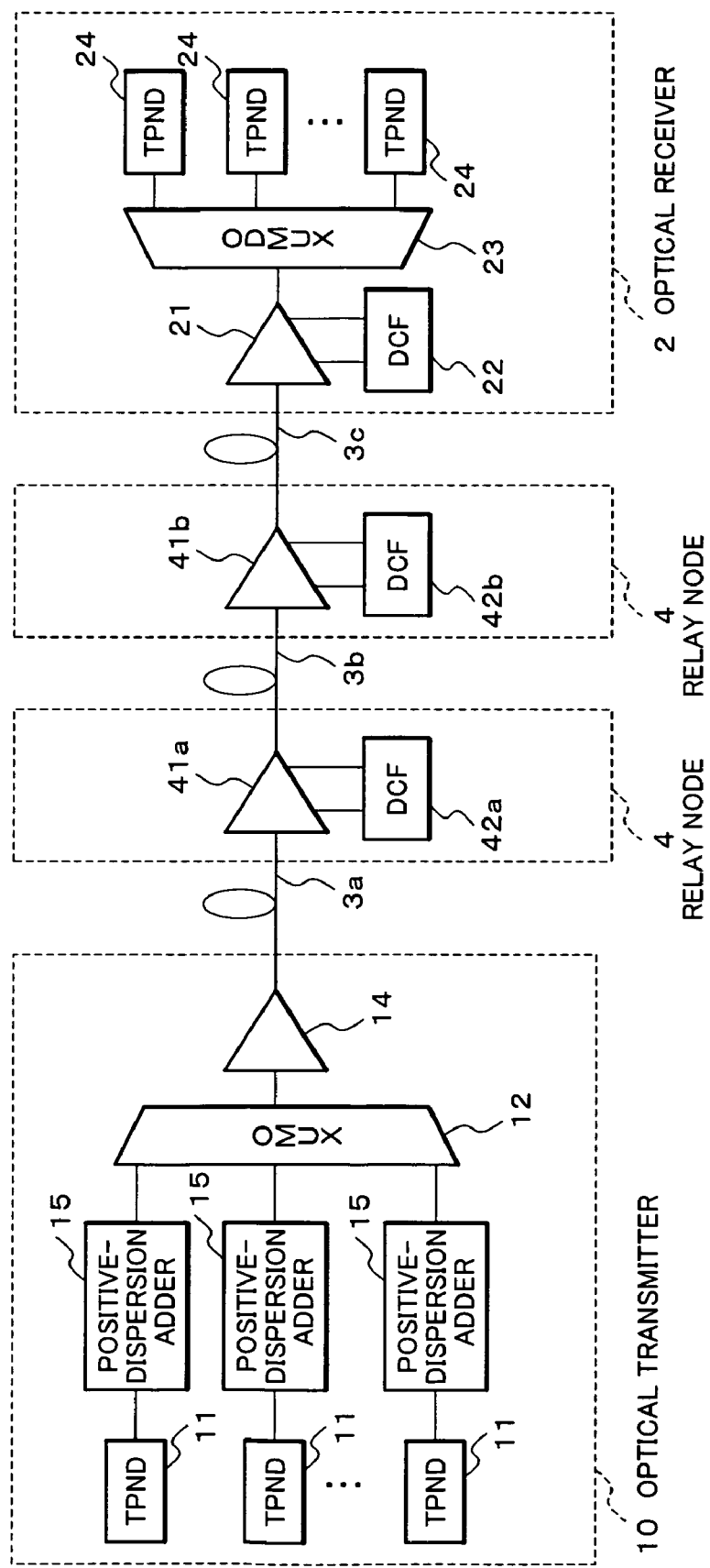
FIG. 15 is a diagram showing a configuration of a WDM optical transmission system according to a third exemplary embodiment of the present invention.

By use of FIG. 15, descriptions will be provided for a WDM optical transmission system according to a third exemplary embodiment of the present invention. This WDM optical transmission system has a configuration in which an optical transmitter 10 and the optical receiver 2 are connected with each other through the optical fiber 3 (spans 3a, 3b, 3c, ...) and the relay nodes 4 (4a, 4b, ...), in common with the WDM optical transmission system according to the first embodiment. The optical receiver 2, the optical fiber 3 and the relay nodes 4 are identical to those included in the first embodiment. However, the optical transmitter 10 is different in configuration from the optical transmitter included in the first embodiment. In this embodiment, the optical transmitter 10 includes no positive-dispersion adder 13, but instead a plurality of positive-dispersion adders 15. The other parts of the configuration, which are denoted by the same reference numerals as those in the first embodiment, are the same as those in FIG. 4A.

The transponders 11 in this embodiment may be the same as those which have been described with regard to the first embodiment. However, transponders 11 in this embodiment output an optical signal to the respective positive-dispersion adders 15. Each of the positive-dispersion adders 15 gives a positive/preset dispersion value X to the optical signal, and outputs the optical signal to the OMUX 12. A dispersion value added by each of the positive-dispersion adders 15 is equal to the optimum residual dispersion value at the optical receiver 2. In this embodiment, the added dispersion value is in a range of +100 ps/nm to +500 ps/nm. The OMUX 12 multiplexes the optical signals inputted from each of the positive-dispersion adders 15, as described above.

In this embodiment, a preset dispersion value can be individually added to each wavelength component of the WDM signal. Thereby, the positive dispersion value can be added to each wavelength component more evenly. Specifically, if the residual dispersion value suitable for each wavelength component of the WDM signal is given to the wavelength component, this makes it possible to obtain a higher-quality transmission characteristic (lower bit error rate). In this embodiment, too, if the WDM signal sent out from the optical transmitter 1 is transmitted to the optical receiver 2 while the WDM signal is being compensated by 100% from one relay node 4 to another, this makes it possible to make the residual dispersion value at the optical receiver 2 an optimum value.

Fourth Exemplary Embodiment

Figure 16:
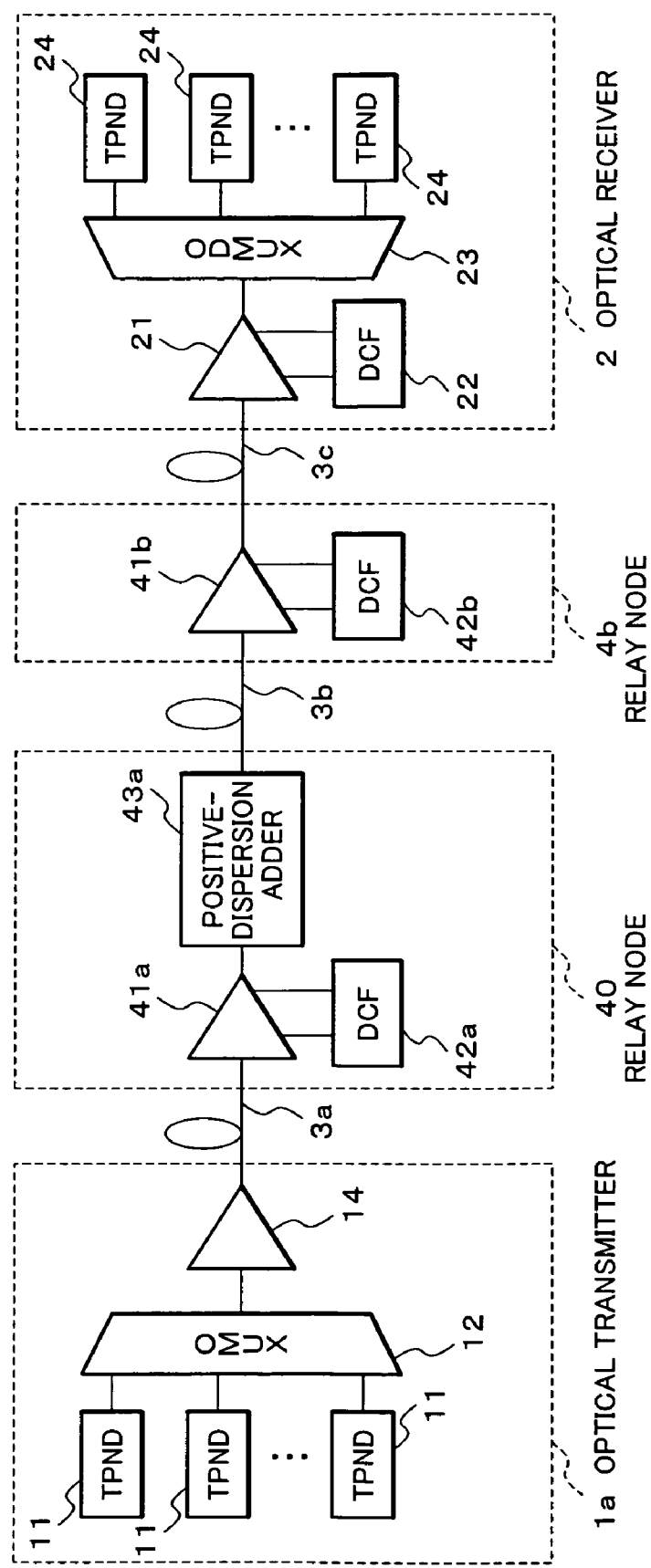
FIG. 16 is a diagram showing a configuration of a WDM optical transmission system according to a fourth exemplary embodiment of the present invention.

By use of FIG. 16, descriptions will be provided for a WDM optical transmission system according to a fourth exemplary embodiment. This WDM optical transmission system has a configuration in which an optical transmitter $1a$ and the optical receiver 2 are connected with each other through the optical fiber 3 (spans $3a$, $3b$ and $3c$) and the relay nodes 40 and $4b$. The optical receiver 2 and the optical fiber 3 are identical to those included in the first embodiment. However, the optical transmitter $1a$ and the relay node 40 are different in configuration from those included in the first embodiment.

The transmitter $1a$ in this embodiment includes no positive-dispersion adder 13. Accordingly, the WDM signal outputted from the OMUX 12 is inputted directly into the optical amplifier 14. In addition, the relay node 40 includes a positive-dispersion adder $43a$ in a stage following the optical amplifier $41a$. The positive-dispersion adder $43a$ adds to the WMD signal a preset dispersion value X equal to the optimum residual dispersion value for the optical receiver 2. In this embodiment, the added positive dispersion value is in a range of +100 ps/nm to +500 ps/nm.

Figure 17A:
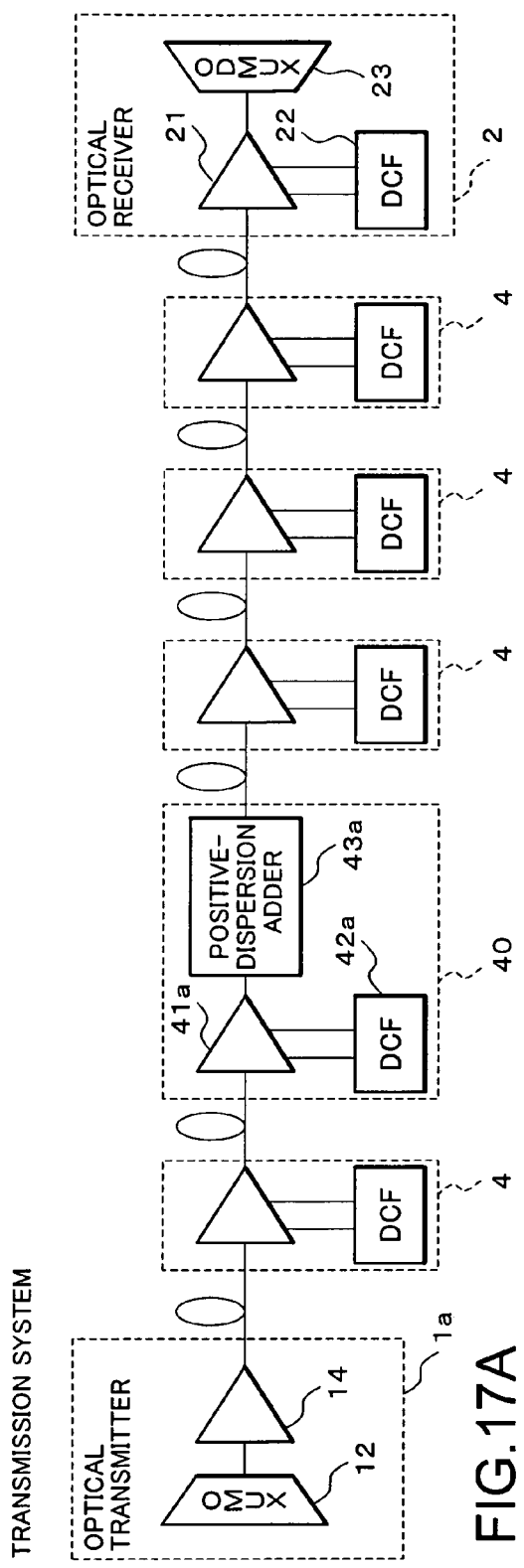
FIG. 17A and FIG. 17B are diagrams showing a dispersion map of a residual dispersion value in the fourth embodiment of the present invention.
Figure 17B:
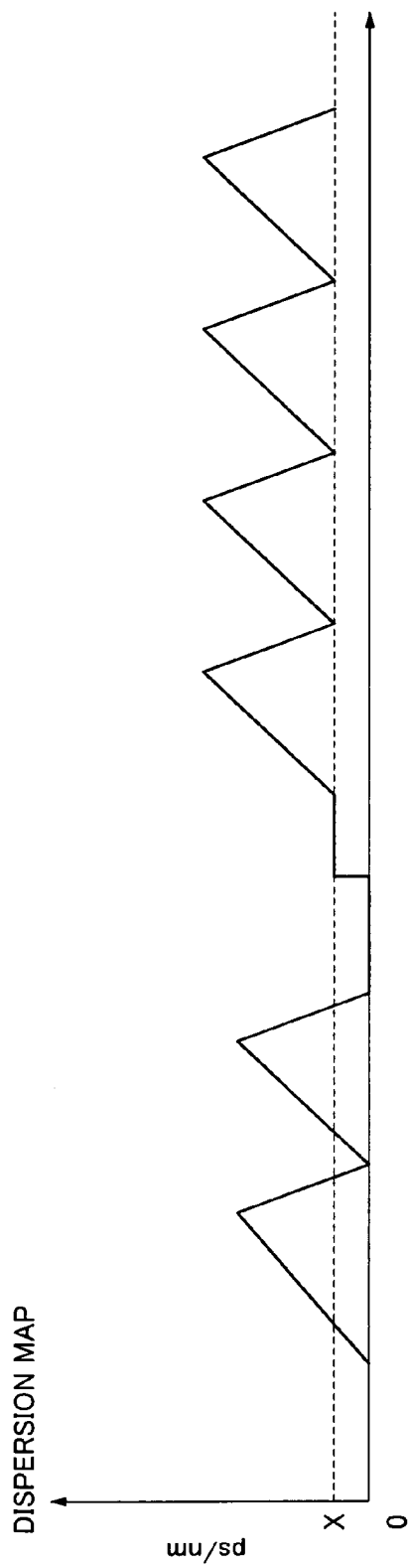

FIG. 17A and FIG. 17B show a dispersion map of the WDM optical transmission system according to this embodiment. The WDM signal with "0" dispersion is sent out from the optical transmitter $1a$ to the relay node 40 through the optical fiber $3a$. With regard to the WDM signal inputted into the relay node 40, the DCF $42a$ compensates by 100% the chromatic dispersion which the WDM signal has suffered in the optical fiber $3a$. The compensated WDM signal is amplified, by the optical amplifier $41a$, to a signal strength large enough for the WDM signal to be transmitted to the following relay node $4b$. The positive-dispersion adder $43a$ adds a positive dispersion value to the amplified WDM signal. Thereafter, the WDM signal is sent out to the relay node $4b$ through the optical fiber $3b$. In the relay node $4b$, the DCF $42b$ compensates by 100% the chromatic dispersion suffered in the optical fiber $3b$. Subsequently, the compensated WDM signal is amplified by the optical amplifier $41b$, and is sent out to the optical receiver 2.

The optimum dispersion at the optical receiver 2 remains in the WDM signal reached the optical receiver 2 in this manner. For this reason, in the case of this embodiment, too, if the WDM signal sent out from the optical transmitter 1 is transmitted to the optical receiver 2 while the WDM signal is being compensated by 100% from one relay node 4 to another, this makes the residual dispersion value at the optical receiver 2 an optimum value.

The WDM optical transmission system according to this embodiment has been described giving the case where the optimum dispersion value for the optical receiver 2 is added to the WDM signal in the relay node 40. It should be noted, however, that this dispersion value may be added to the WDM signal in the relay node $4b$ instead. In other words, the dispersion value may be added to the WDM signal in an arbitrary relay node provided to the transmission path (optical fiber 3) between the optical transmitter $1a$ and the optical receiver 2.

Furthermore, the number of relay nodes to add preset dispersion value is not necessarily limited to one. For example, in a case where the optimum residual dispersion value for the optical receiver 2 is +300 ps/nm, dispersion values of +200 ps/nm and +100 ps/nm may be added to the WDM signal respectively in the relay node 40 and the following relay node $4b$.

In the case of the WDM optical transmission system according to this embodiment, the optimum dispersion value is added to the WDM signal in the relay node(s) in the transmission path. For this reason, even if the optical transmitter has the same configuration as the conventional optical transmitter has, the optical receiver receives the WDM signal in which the optimum dispersion value remains. As a result, only if the relay node in the conventional WDM optical transmission system is replaced with the relay node for the WDM optical transmission system according to this embodiment, the effects of the present invention can be obtained even from the conventional WDM optical transmission system. Hence, even in a case where the conventional optical transmitter can not be replaced with the optical transmitter system according to the present invention, the WDM signal in which the optimum dispersion value is caused to remain can be received by the receiving terminal.

In addition, the WDM optical transmission system according to the present invention may be a system which is obtained by combining the first and the fourth embodiments. In other words, the preset dispersion value may be added to the WDM signal in the optical transmitter, the dispersion value may be additionally added to the WDM signal in an arbitrary relay node, and thereby the optimum residual dispersion value may be designed to be obtained finally at the optical receiver.

It should be noted, moreover, that the relay nodes are not always needed if the transmission distance is short, although the first, the second and the third embodiments have been described giving examples of configurations having the relay nodes being provided to the transmission path.

As well, the configuration including the OADM node which has been described with regard to the second embodiment can be combined with each of the WDM optical transmission systems according to the third and the fourth embodiments. In the case, however, where the configuration including the OADM is combined with the WDM optical transmission system according to the fourth embodiment, the OADM node adds to the ADD signal the dispersion which is equal to that added to the though signal.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

Further, it is the inventor's intention to retain all equivalents of the claimed invention even if the claims are amended during prosecution.

What is claimed is:

1. A wavelength division multiplexing optical transmission system comprising:

an optical transmitter for transmitting, to an optical fiber transmission path, a WDM signal which is obtained by multiplexing a plurality of optical signals on the optical fiber transmission path in terms of wavelength, the plurality of optical signals respectively having negative chirps, and the plurality of optical signals differing from one another in wavelength;

an optical receiver for receiving the WDM signal from the optical fiber transmission path; and at least one relay node provided between the optical transmitter and the optical receiver, wherein the optical transmitter includes a dispersion adder for beforehand adding a predetermined positive dispersion amount to the WDM signal before the WDM signal is transmitted, and wherein each of the relay nodes and the optical receiver includes a dispersion compensator for compensating a chromatic dispersion suffered in the optical fiber transmission path in the immediately preceding transmission span.

2. The wavelength division multiplexing optical transmission system according to claim 1, wherein the dispersion adder in the optical transmitter adds the predetermined dispersion amount collectively to each wavelength component of the WDM signal.

3. The wavelength division multiplexing optical transmission system according to claim 2, wherein a photonic crystal fiber is used for the dispersion adder.

4. The wavelength division multiplexing optical transmission system according to claim 2, wherein a single-mode fiber is used for the dispersion adder.

5. The wavelength division multiplexing optical transmission system according to claim 1, wherein the dispersion adder in the optical transmitter adds the predetermined dispersion amount individually to each wavelength component in the WDM signal.

6. The wavelength division multiplexing optical transmission system according to claim 5, wherein a photonic crystal fiber is used for the dispersion adder.

7. The wavelength division multiplexing optical transmission system according to claim 5, wherein a single-mode fiber is used for the dispersion adder.

8. The wavelength division multiplexing optical transmission system according to claim 1, wherein at least one of the relay nodes further includes:

an additional-signal dispersion adder for adding the predetermined positive dispersion amount to an additional optical signal, which is an optical signal with a predetermined wavelength having a negative chirp, and which is superimposed on the WDM signal; and an optical-signal adder for superimposing the additional optical signal, which the predetermined dispersion amount is added to, on the WDM signal received from the immediately preceding transmission span.

9. The wavelength division multiplexing optical transmission system according to claim 8, wherein a photonic crystal fiber is used for the dispersion adder in the optical transmitter and the additional-signal dispersion adder in the relay node.

10. The wavelength division multiplexing optical transmission system according to claim 8, wherein a single-mode fiber is used for the dispersion adder in the optical transmitter and the additional-signal dispersion adder in the relay node.

11. The wavelength division multiplexing optical transmission system according to claim 1, wherein each optical signal in the optical transmitter is modulated by an LN optical modulator which operates with a negative chirp coefficient.

12. The wavelength division multiplexing optical transmission system according to claim 1, wherein the predetermined dispersion amount is not smaller than +100 ps/nm, and smaller than +500 ps/nm.

13. The wavelength division multiplexing optical transmission system according to claim 1, wherein the optical fiber transmission path is a dispersion shifted fiber.

14. A wavelength division multiplexing optical transmission system comprising:

optical transmission means for transmitting, to an optical fiber transmission path, a WDM signal which is obtained by multiplexing a plurality of optical signals on the optical fiber transmission path in terms of wavelength, the plurality of optical signals respectively having negative chirps, and the plurality of optical signals differing from one another in wavelength;

optical reception means for receiving the WDM signal from the optical fiber transmission path; and at least one relay node means which is provided between the optical transmission means and the optical reception means, wherein the optical transmission means includes dispersion adding means for beforehand adding a predetermined positive dispersion amount to the WDM signal before the WDM signal is transmitted, and wherein each of the relay node means and the optical reception means includes dispersion compensating means for compensating a chromatic dispersion suffered in the optical fiber in the immediately preceding transmission span.

15. The wavelength division multiplexing optical transmission system according to claim 14, wherein at least one of the relay node means further includes:

additional-signal dispersion adding means for adding the predetermined positive dispersion amount to an additional optical signal, which is an optical signal with a predetermined wavelength having a negative chirp, and which is superimposed on the WDM signal; and optical-signal adding means for superimposing the additional optical signal, which the predetermined dispersion amount is added to, on the WDM signal received from a transmission span immediately preceding the optical-signal adding means.

16. A wavelength division multiplexing optical transmission method in a wavelength division multiplexing optical transmission system including an optical transmitter, an optical receiver and at least one relay node which is provided between the optical transmitter and the optical receiver, the transmission method comprising the steps of:

causing the optical transmitter to add a predetermined positive dispersion amount to a WDM signal which is obtained by multiplexing a plurality of optical signals on the optical fiber transmission path in terms of wavelength, and to thus transmit the VDM signal to an optical fiber transmission path, the plurality of optical signals modulated by an optical modulator so as to respectively have negative chirps, and the plurality of optical signals differing from one another in wavelength;

causing each of the relay nodes to compensate a chromatic dispersion, which the received WDM signal has suffered in the optical fiber in the immediately preceding transmission span, and to thus transmit the WDM signal to the transmission path in the following transmission span; and causing the optical receiver to compensate a chromatic dispersion, which the received WDM signal has suffered in the optical fiber in the immediately preceding transmission span, and to thereby obtain the received WDM signal, which includes the predetermined positive dispersion amount.

17. The wavelength division multiplexing optical transmission method according to claim 16, wherein, in the step of causing the optical transmitter to add the predetermined positive dispersion amount to the WDM signal, the predetermined positive dispersion amount is added collectively to each wavelength component of the WDM signal.

18. The wavelength division multiplexing optical transmission method according to claim 16, wherein, in the step of causing the optical transmitter to add the predetermined positive dispersion amount to the WDM signal, the predetermined positive dispersion amount is added individually to each wavelength component of the WDM signal.

19. The wavelength division multiplexing optical transmission method according to claim 16, wherein at least one of the relay nodes further includes the steps of:
   adding the predetermined positive dispersion amount to an additional optical signal, which is an optical signal with a predetermined wavelength having a negative chirp, and which is superimposed on the WDM signal; and
   superimposing the additional optical signal, which the predetermined positive dispersion amount is added to, on the WDM signal received from an immediately preceding transmission span,
   in addition to the step of causing the relay nodes to transmit the WDM signal, whose chromatic dispersion is compensated, to the transmission path.

20. The wavelength division multiplexing optical transmission method according to claim 16, wherein, in the step of causing the optical transmitter to add the predetermined positive dispersion amount to the WDM signal, each optical signal is modulated by an LN optical modulator which operates with a negative chirp coefficient.

21. The wavelength division multiplexing optical transmission method according to claim 16, wherein, in the step of causing the optical transmitter to add the predetermined positive dispersion amount to the WDM signal, each predetermined positive dispersion amount is not smaller than +100 ps/nm, and smaller than +500 ps/nm.

22. The wavelength division multiplexing optical transmission method according to claim 16, wherein, in the step of causing the optical transmitter to add the predetermined positive dispersion amount to the WDM signal, the predetermined positive dispersion amount is added by use of a photonic crystal fiber.

23. The wavelength division multiplexing optical transmission method according to claim 16, wherein, in the step of causing the optical transmitter to add the predetermined positive dispersion amount to the WDM signal, the predetermined positive dispersion amount is added by use of a single-mode fiber.

24. The wavelength division multiplexing optical transmission method according to claim 16, wherein the optical fiber transmission path is a dispersion shifted fiber.

25. A wavelength division multiplexing optical transmission method in a wavelength division multiplexing optical transmission system including an optical transmitter, an optical receiver and at least one relay node which is provided between the optical transmitter and the optical receiver, the transmission method comprising the steps of:
   causing the optical transmitter to transmit, to an optical fiber transmission path, a WDM signal which is obtained by multiplexing a plurality of optical signals on the optical fiber transmission path in terms of wavelength, the plurality of optical signals respectively having negative chirps, and the plurality of optical signals differing from one another in wavelength;
   causing each of the relay nodes to compensate a chromatic dispersion, which the received WDM signal has suffered in the optical fiber in the immediately preceding transmission span, and to thus transmit the WDM signal to the transmission path in the following transmission span;
   causing at least one of the relay nodes to further add a predetermined positive dispersion amount to the WDM signal before the WDM signal is transmitted to the optical fiber in the following transmission span; and
   causing the optical receiver to compensate a chromatic dispersion, which the received WDM signal has suffered in the optical fiber in the immediately preceding transmission span, and to thereby obtain the received WDM signal, which includes the predetermined positive dispersion amount.

26. The wavelength division multiplexing optical transmission method according to claim 25, wherein, in the step of causing the optical transmitter to transmit the WDM signal to an optical fiber transmission path, each optical signal is modulated by an LN optical modulator which operates with a negative chirp coefficient.

27. The wavelength division multiplexing optical transmission method according to claim 25, wherein, in the step of causing the relay node to add the predetermined positive dispersion amount to the WDM signal, the predetermined positive dispersion amount is not smaller than +100 ps/nm, and smaller than +500 ps/nm.

28. The wavelength division multiplexing optical transmission method according to claim 25, wherein, in the step of causing the relay node to add the predetermined positive dispersion amount to the WDM signal, the predetermined positive dispersion amount is added by use of a photonic crystal fiber.

29. The wavelength division multiplexing optical transmission method according to claim 25, wherein, in the step of causing the relay node to add the predetermined positive dispersion amount to the WDM signal, the predetermined positive dispersion amount is added by use of a single-mode fiber.

30. The wavelength division multiplexing optical transmission method according to claim 25, wherein, the optical fiber transmission path is a dispersion shifted fiber.

\* \* \* \* \*